(12) United States Patent
Hirota et al.

(10) Patent No.: US 6,781,128 B2
(45) Date of Patent: Aug. 24, 2004

(54) INFRARED RADIATION DETECTING DEVICE

(75) Inventors: Masaki Hirota, Zushi (JP); Yasushi Nakajima, Kawasaki (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/315,072

(22) Filed: Dec. 10, 2002

(65) Prior Publication Data

US 2003/0133489 A1 Jul. 17, 2003

(30) Foreign Application Priority Data

Jan. 17, 2002 (JP) .................................... P2002-008264

(51) Int. Cl.[7] .............................................. G01J 5/02
(52) U.S. Cl. .................................... 250/338.1; 250/332
(58) Field of Search ................................ 250/330, 332, 250/338.1, 338.2, 338.3, 338.4, 339.02, 340

(56) References Cited

U.S. PATENT DOCUMENTS 6,040,577 A * 3/2000 Mauduit .................. 250/338.1

6,348,650 B1 2/2002 Endo et al.

FOREIGN PATENT DOCUMENTS

JP 2000-340848 A 12/2000

* cited by examiner

*Primary Examiner*—Constantine Hannaher
*Assistant Examiner*—Timothy Moran
(74) *Attorney, Agent, or Firm*—Shinjyu Global IP Counselors, LLP

(57) ABSTRACT

An infrared radiation detecting device is constructed using a manufacturing method to increase the infrared radiation absorptance of the infrared radiation absorbing film. The infrared radiation detecting device has an infrared radiation absorbing film. In one embodiment, the infrared radiation absorbing film has a varying film thickness. The film thickness difference between the thickest points and the thinnest points and the spacing between the thickest points within the same plane are set to decrease the effective surface reflectance cause by the interference or scattering effects of the infrared radiation. Preferably, the film thickness differences between the thickest points and the thinnest points are equal to or greater than ¼ of the wavelength of the infrared radiation being measured, and the spacing between the thickest points within the same plane is shorter than the wavelength of the infrared radiation being measured.

15 Claims, 19 Drawing Sheets

INFRARED RADIATION DETECTING DEVICE

BACKGROUND OF THE INVENTION

1. Field of the Invention

The present invention generally relates to infrared radiation detecting devices as well as methods and apparatuses for manufacturing infrared radiation detecting devices. More specifically, the present invention relates to infrared radiation detecting devices with improved infrared radiation absorptance characteristics as well as methods and apparatuses for manufacturing infrared radiation detecting devices with improved infrared radiation absorptance characteristics.

2. Background Information

There are many different types of infrared radiation detecting devices that are currently available. One type of infrared radiation detecting devices is a thermal type of infrared radiation sensor that utilizes a change in the physical properties of the device when the temperature of the device rises by absorbed infrared radiation. In other words, thermal types of infrared radiation sensors are capable of detecting a heat radiation source by examining the temperature distribution in a space to be measured.

An example of a thermal infrared radiation sensor is a thermopile infrared radiation sensor that detects a thermal electromotive force developed between metals. In particular, the thermopile infrared radiation sensor utilizes one or more thermocouples in which a thermal electromotive force is generated by a temperature difference between hot and cold junctions of the thermocouples. A thermopile infrared radiation sensor typically includes a substrate, at least one thermocouple formed above the substrate, and a suspending membrane. There are many different constructions of thermopile infrared radiation sensors.

In constructing infrared radiation detecting device such as thermopile infrared radiation sensors, a gold black film is often deposited on the substrate by vapor deposition to serve as an infrared radiation absorbing film. Establishing the order of the processing steps and the atmosphere to be used has been one issue when depositing the gold black film onto the substrate by vapor deposition to form the infrared radiation absorbing film. In response to this issue, the idea of mixing particles of gold black, carbon, or other substance that absorbs infrared radiation into a transparent, resin-light liquid carrier material and forming the infrared radiation absorbing film on the substrate using an inkjet method has been proposed. An example of such a conventional infrared radiation detecting device and method of manufacturing such an infrared radiation detecting device is disclosed in Japanese Laid-Open Patent Publication No. 2000-340848. With the conventional technology disclosed in this Japanese Publication, a resin film containing particles of gold black, carbon, or other substance that absorbs infrared radiation is simply deposited onto the substrate in an even manner using an inkjet method to form the infrared radiation absorbing film.

In view of the above, it will be apparent to those skilled in the art from this disclosure that there exists a need for an infrared radiation detecting device with improved infrared radiation absorptance characteristics as well as methods and apparatuses for manufacturing such an improved infrared radiation detecting device. This invention addresses this need in the art as well as other needs, which will become apparent to those skilled in the art from this disclosure.

SUMMARY OF THE INVENTION

It has been discovered that the surface reflectance of the infrared radiation absorbing film of an infrared radiation detecting device that has been constructed in accordance with the above-mentioned conventional technology cannot be lowered. Thus, the infrared radiation absorptance reflectance of the infrared radiation absorbing film of an infrared radiation detecting device that has been constructed in accordance with the above-mentioned conventional technology cannot be improved.

One object of the present invention is to provide an infrared radiation detecting device, as well as a manufacturing method and manufacturing apparatus for the same, in which the infrared radiation absorptance of the infrared radiation absorbing film can be increased.

The aforementioned object can basically be attained by providing an infrared radiation detecting element comprising an infrared radiation absorbing film constructed to convert incident infrared radiation with a intensity and a predetermined wavelength into thermal energy, and detect the intensity of the incident infrared radiation. The infrared radiation absorbing film has a plurality of thick points with first film thicknesses arranged in a predetermined pattern relative to a plurality of thin points with second film thicknesses. The thick and thin points are configured and arranged such that a predetermined film thickness difference is formed between the thick and thin points and a predetermined spacing within a plane is formed between the thick points. The predetermined spacing and the predetermined film thickness difference are arranged and configured to decrease effective surface reflectance due to interference or scattering of the incident infrared radiation striking the infrared radiation absorbing film.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

Figure 1:
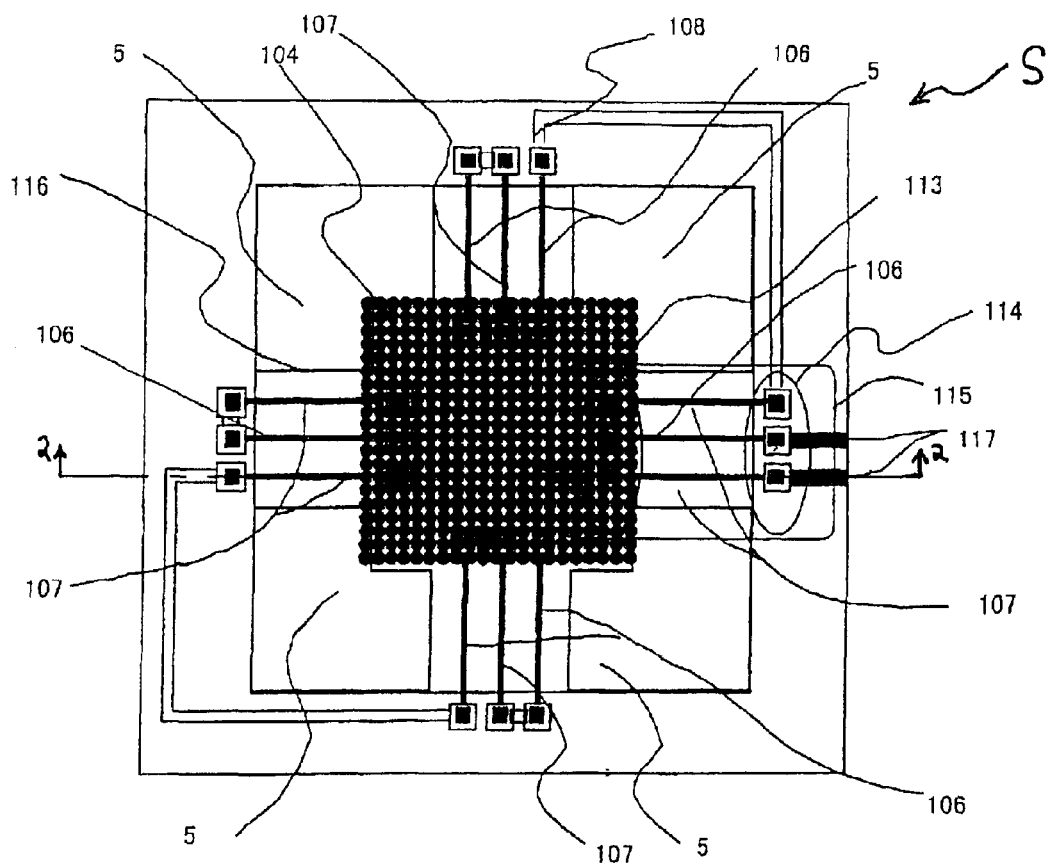
FIG. 1 is a diagrammatic top plan view of a thermopile infrared radiation sensor element in accordance with a first embodiment of the present invention.
Figure 2:
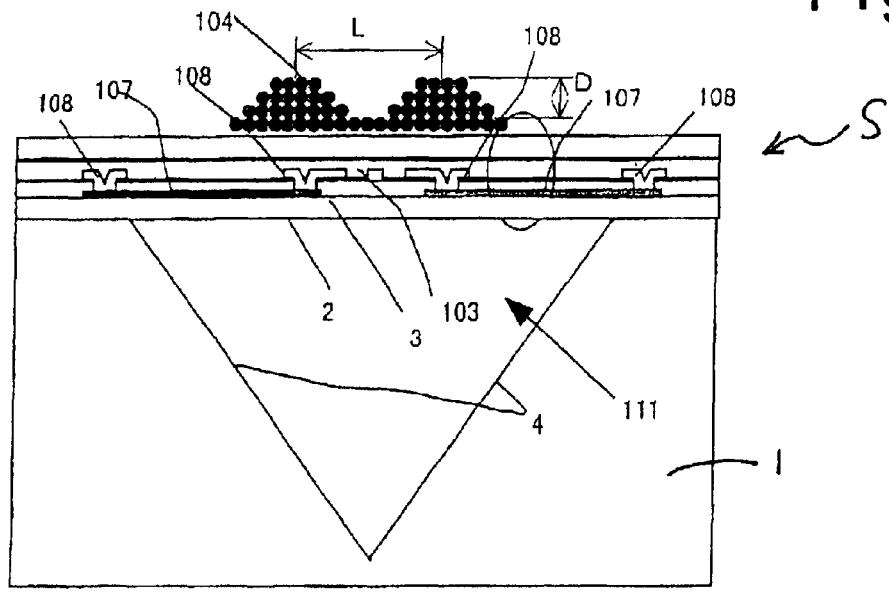
FIG. 2 is a diagrammatic cross sectional view the thermopile infrared radiation sensor element as seen along line 2—2 of FIG. 1, with the various parts and layers being exaggerated for purposes of illustration.
Figure 9:
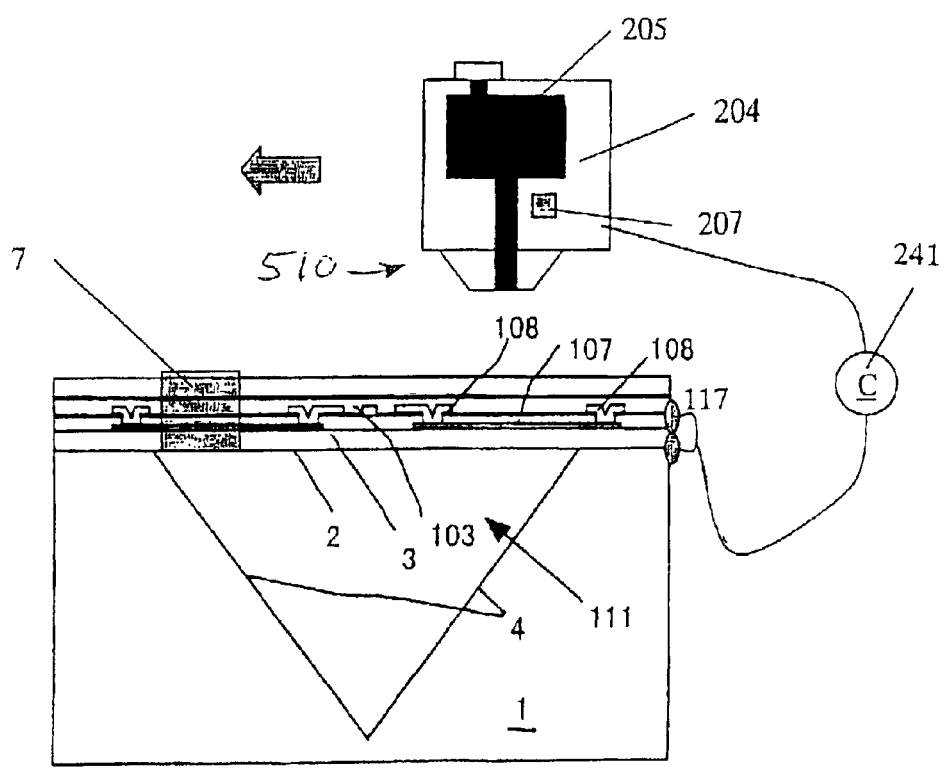
Figure 10:
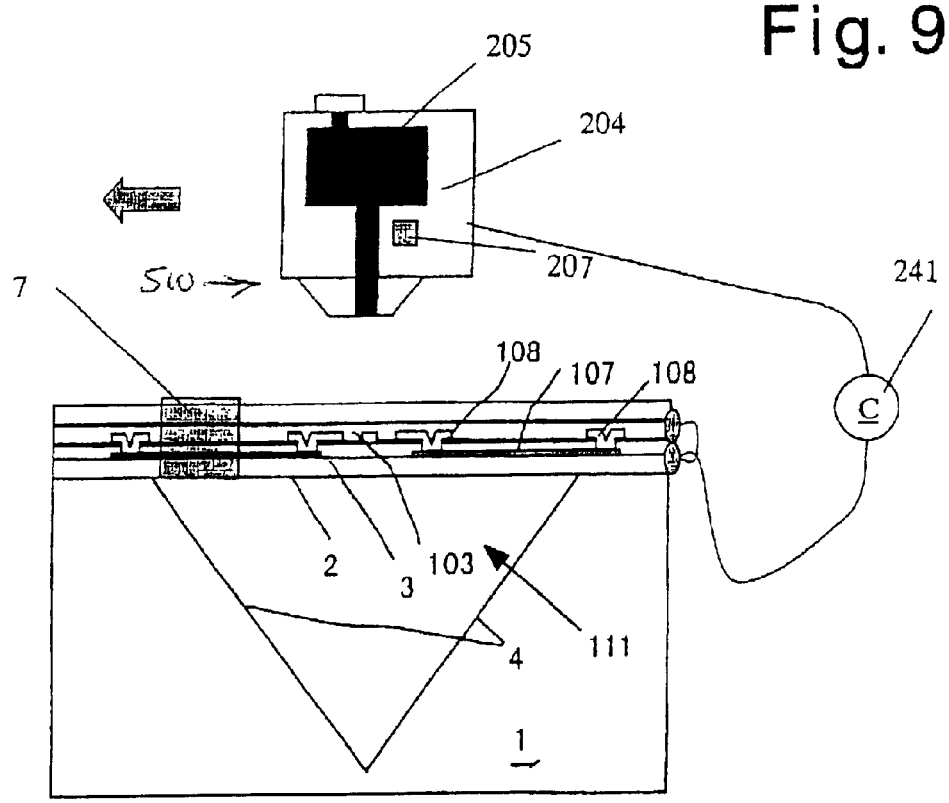
Figure 11:
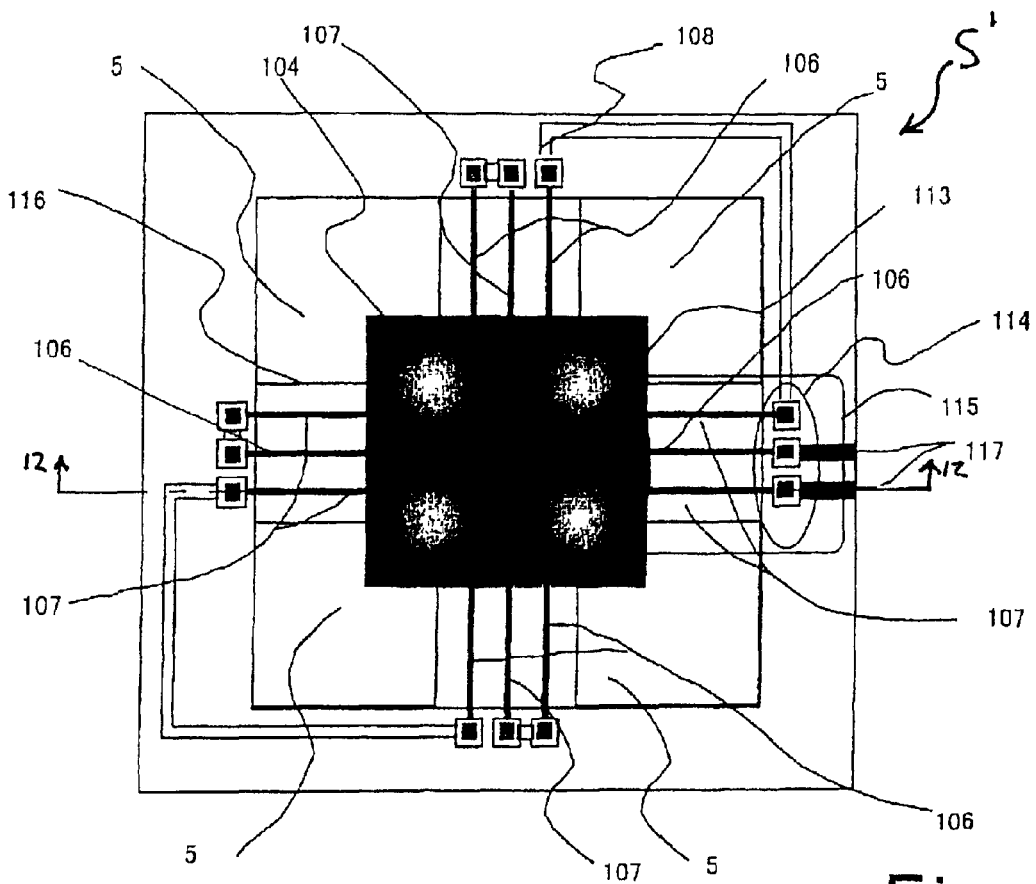
Figure 12:
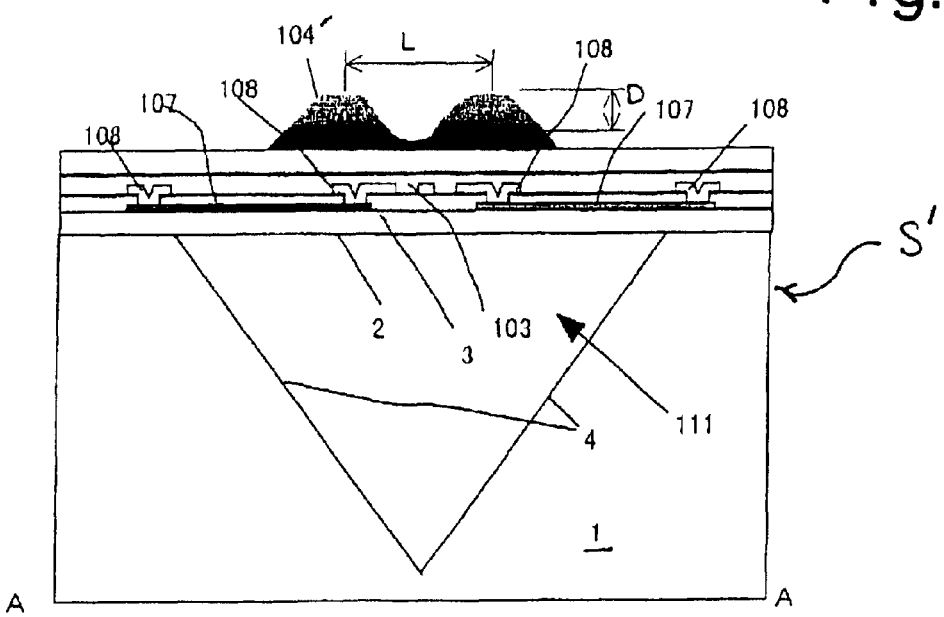
Figure 13:
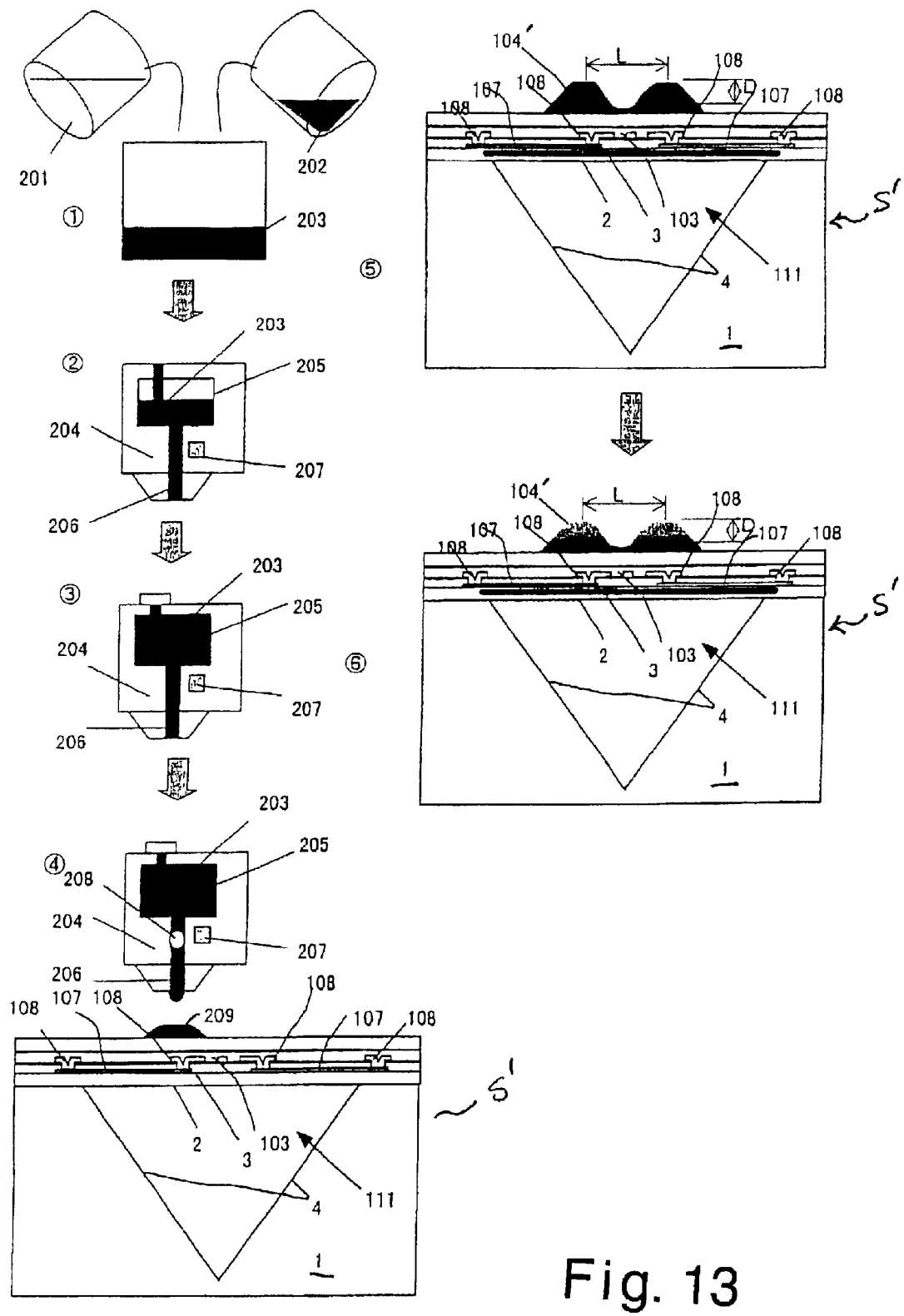
Figure 14:
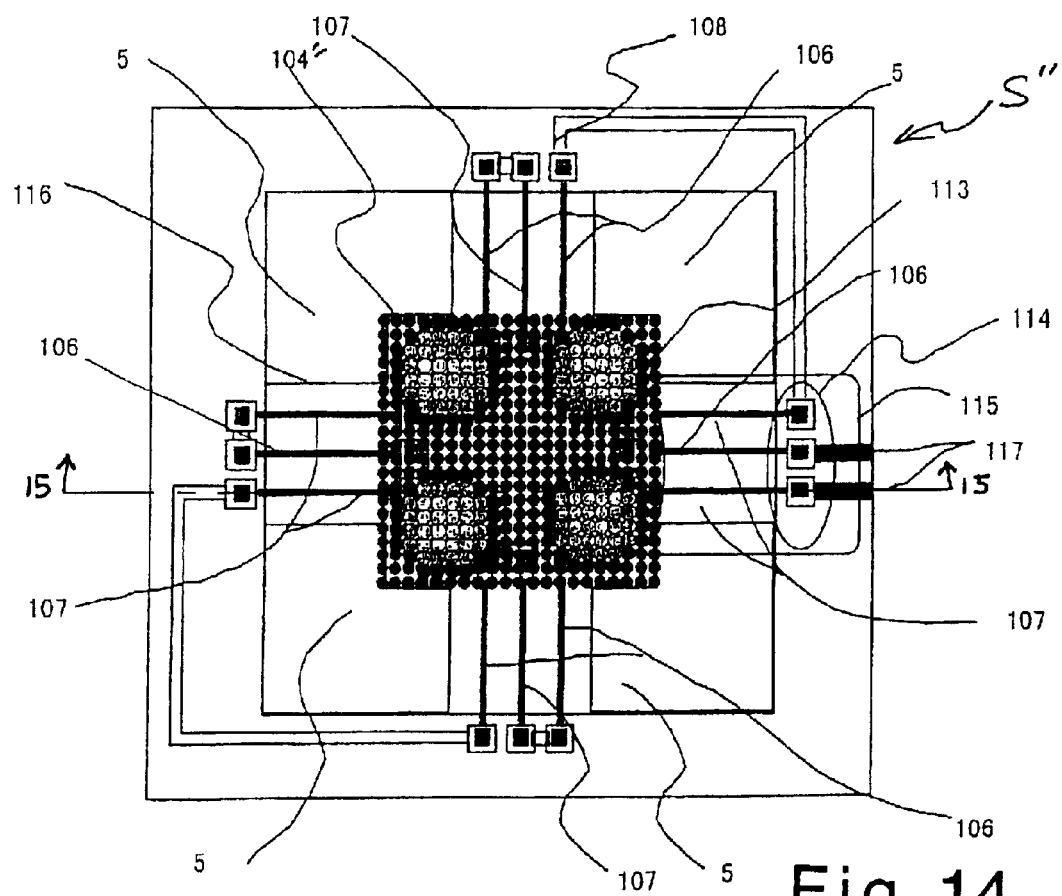
Figure 15:
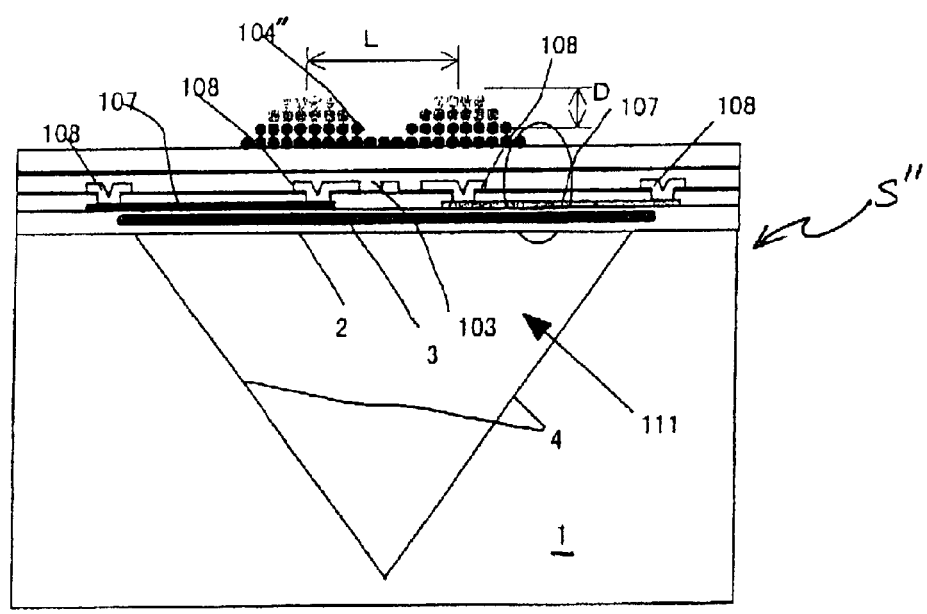
Figure 16:
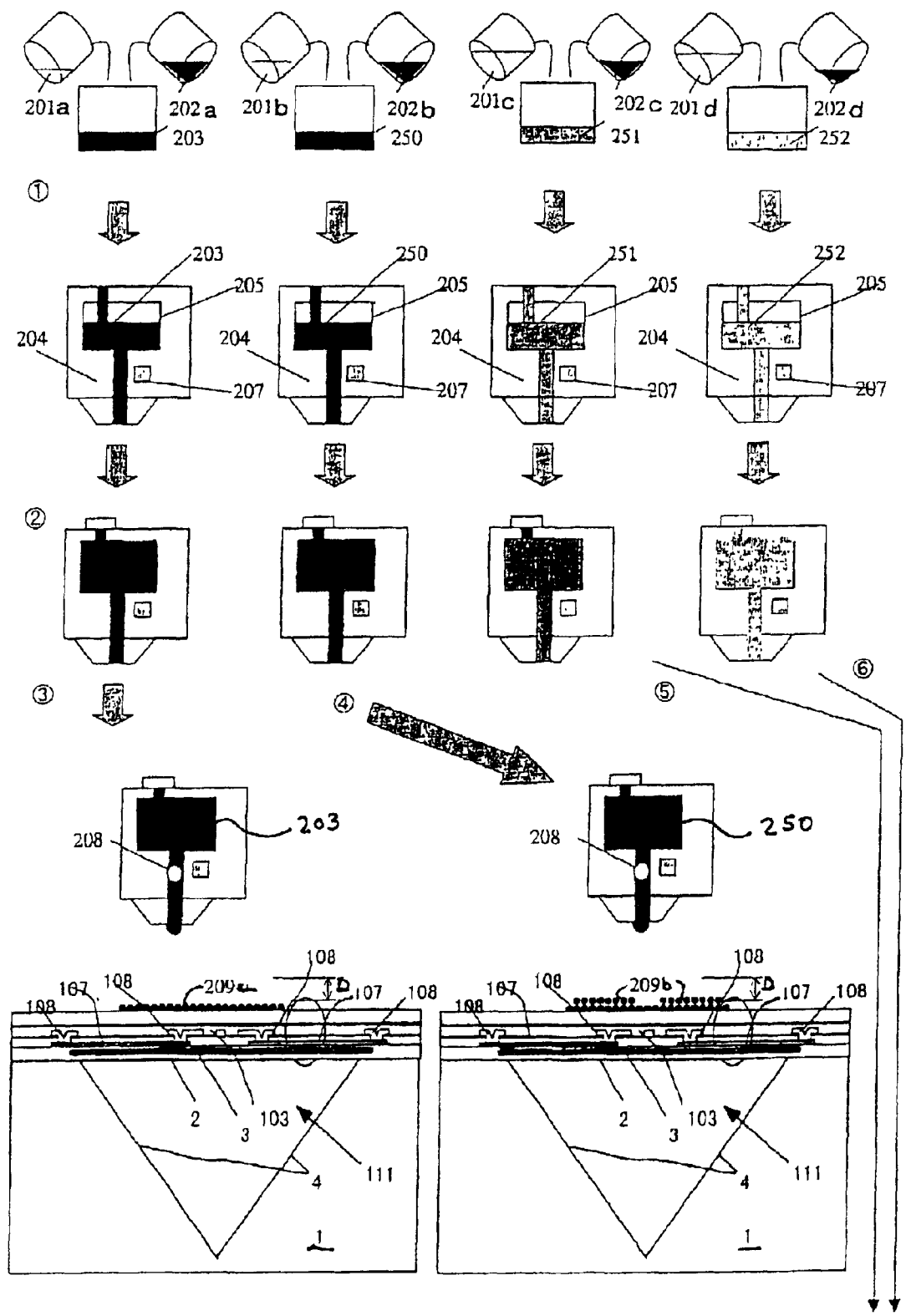
Figure 17:
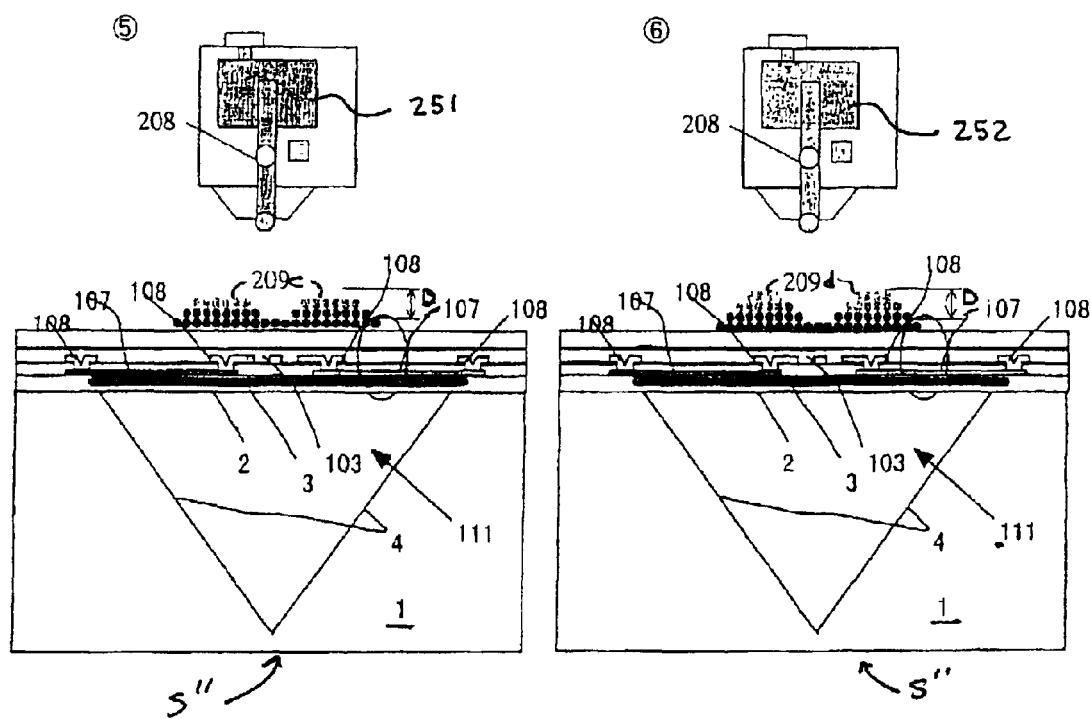
Figure 18:
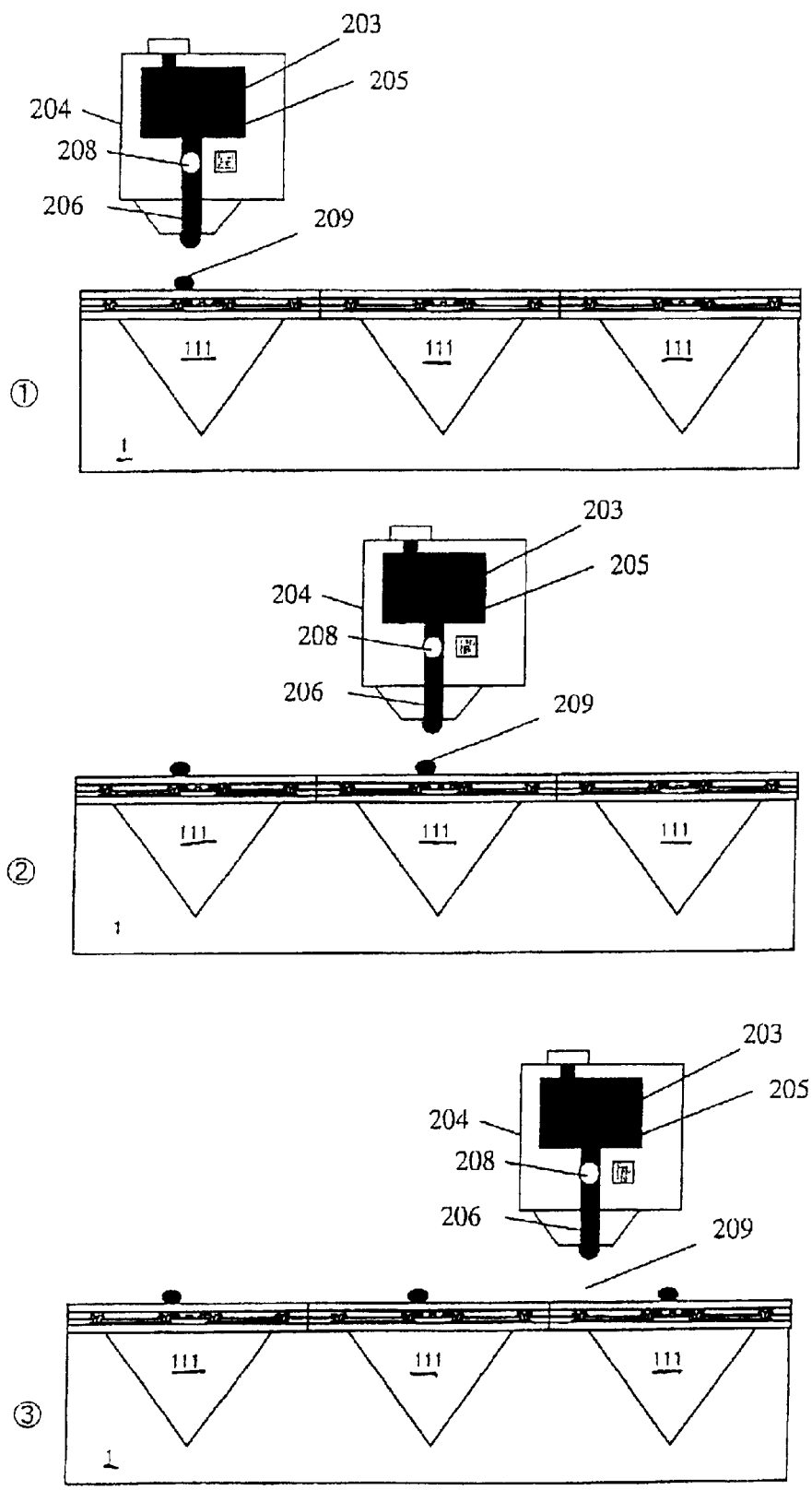
Figure 19:
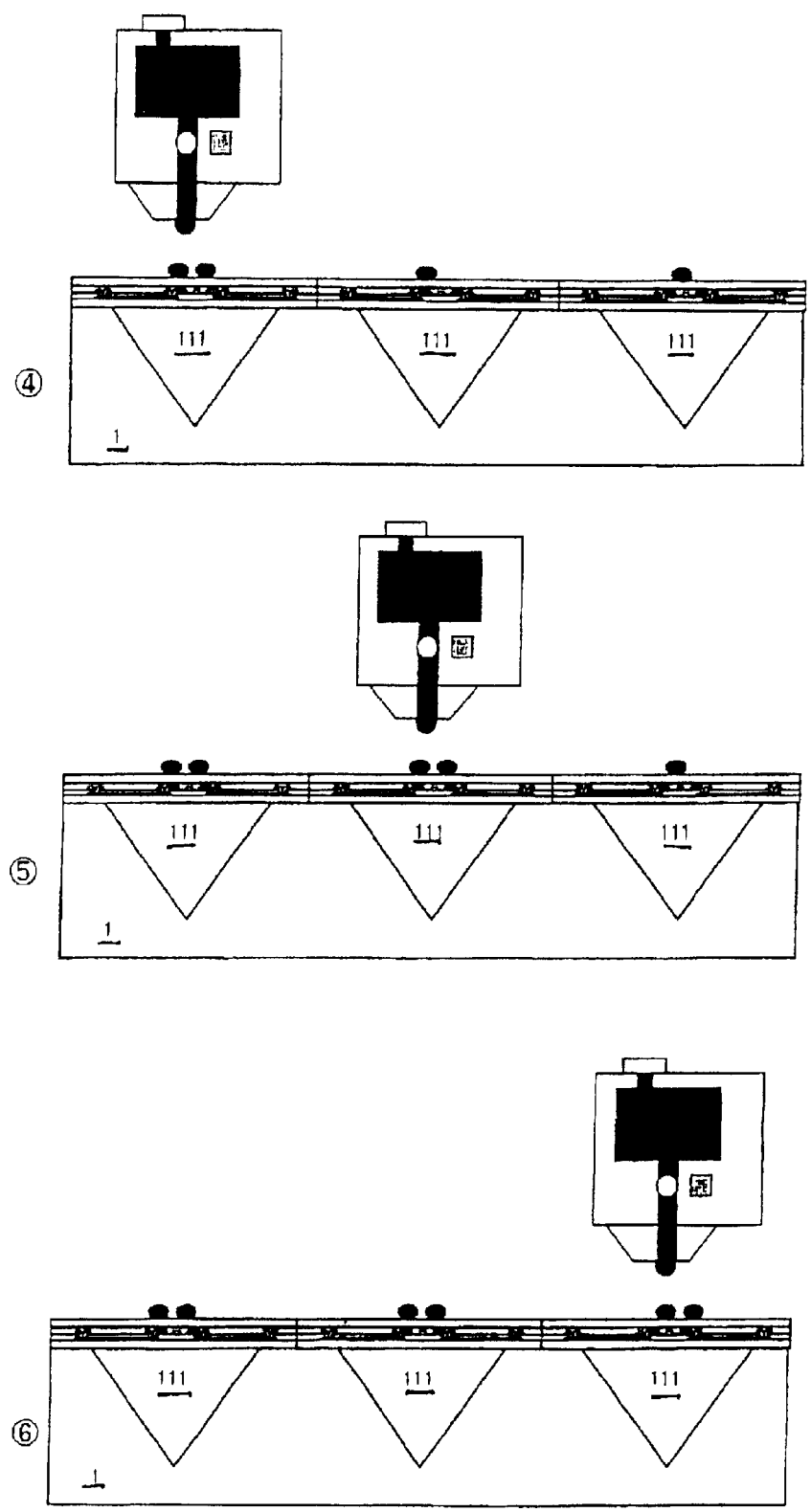
Figure 20:
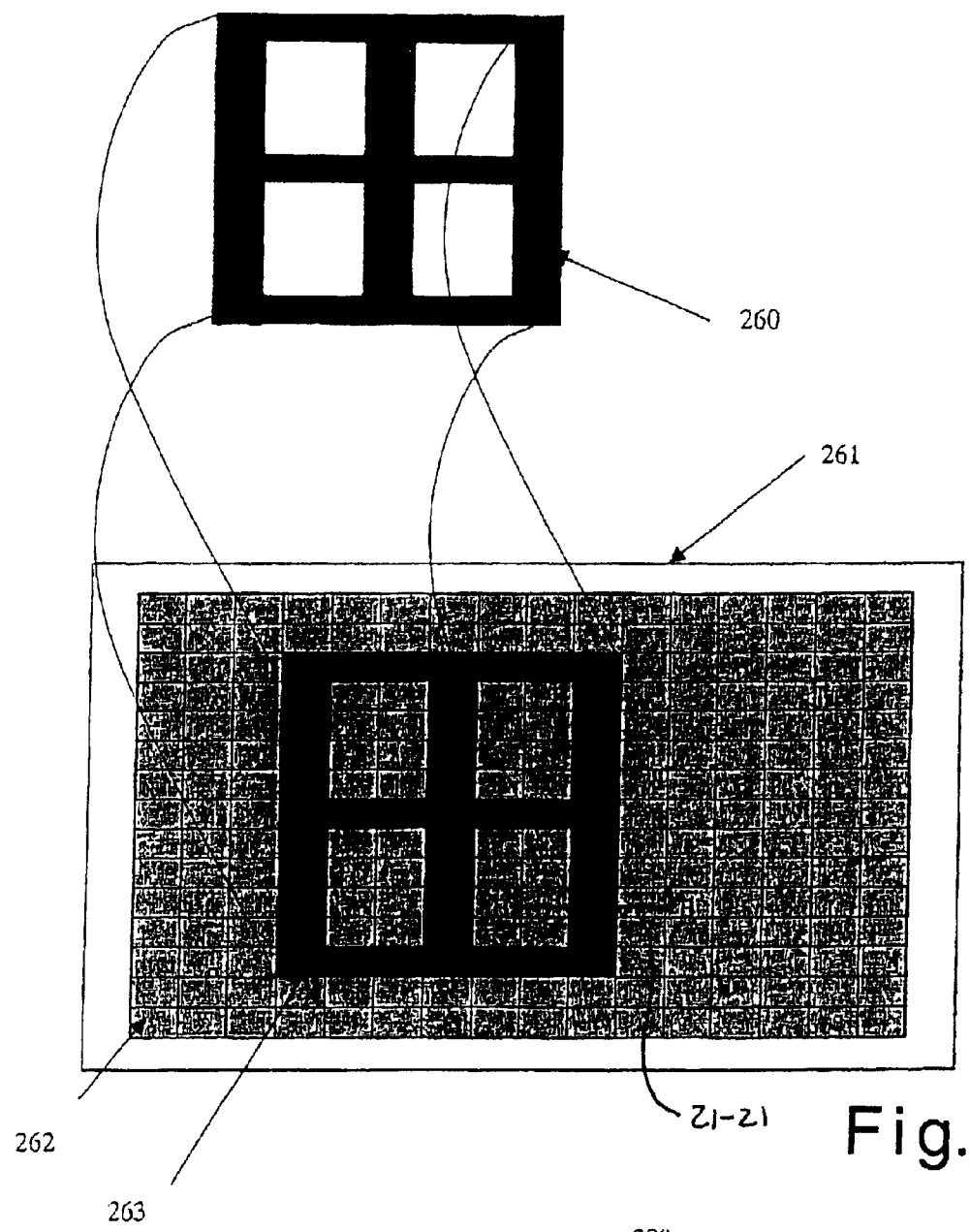
Figure 21:
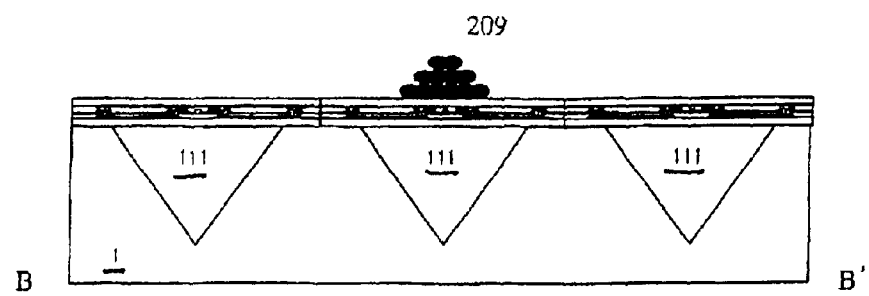
Figure 22:
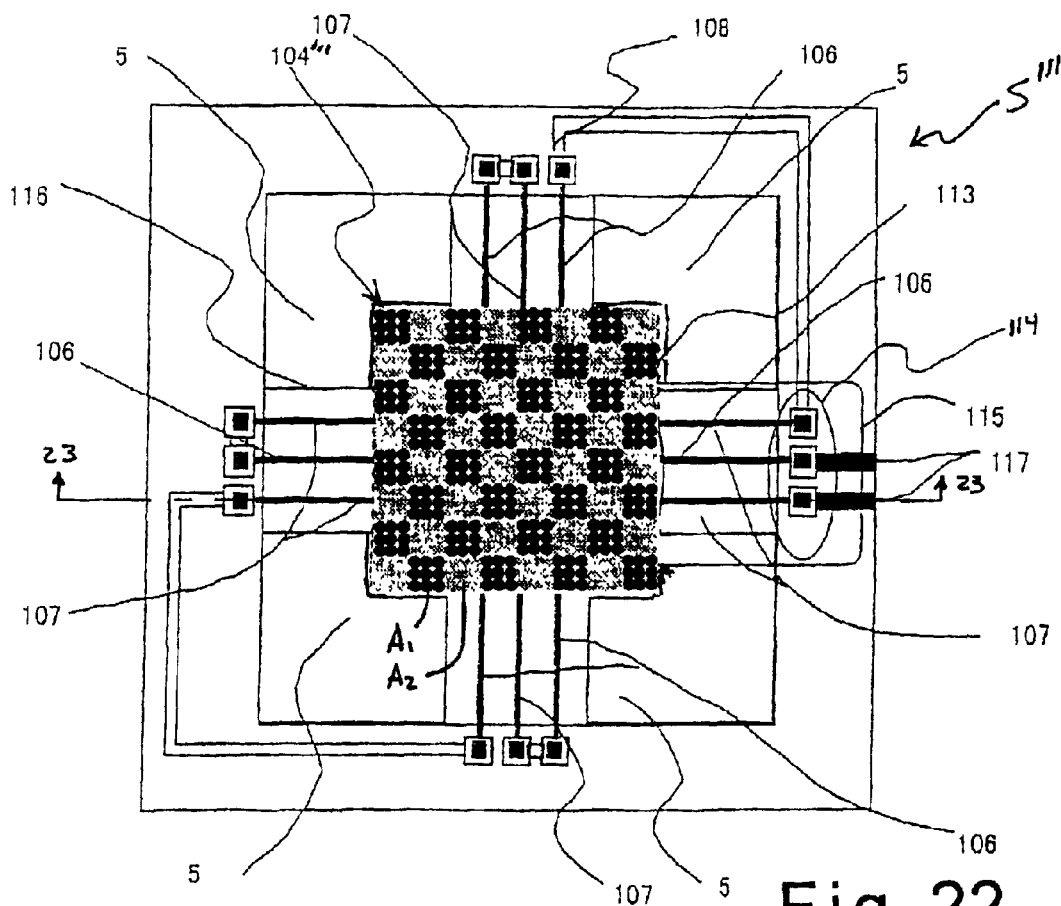
Figure 23:
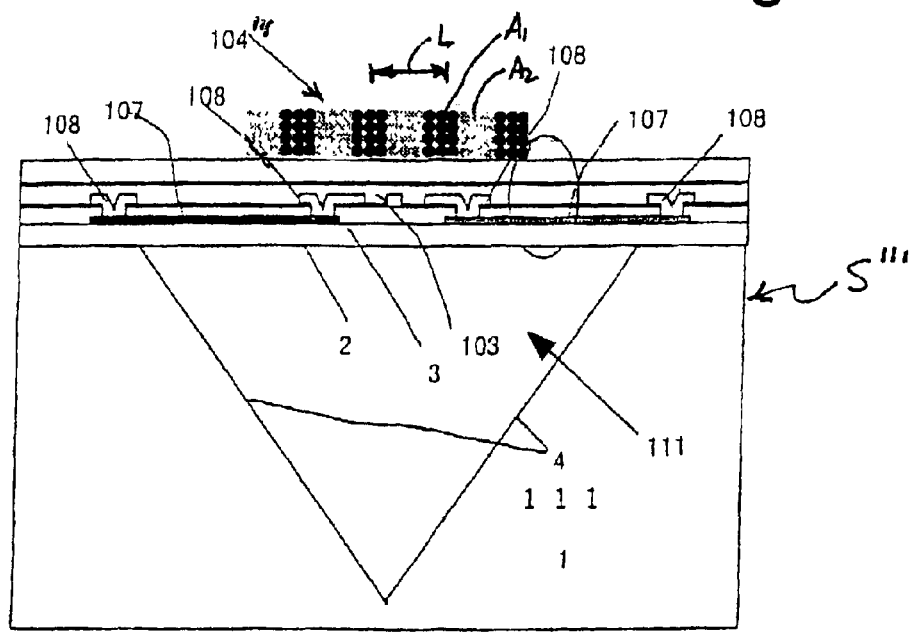
Figure 24:
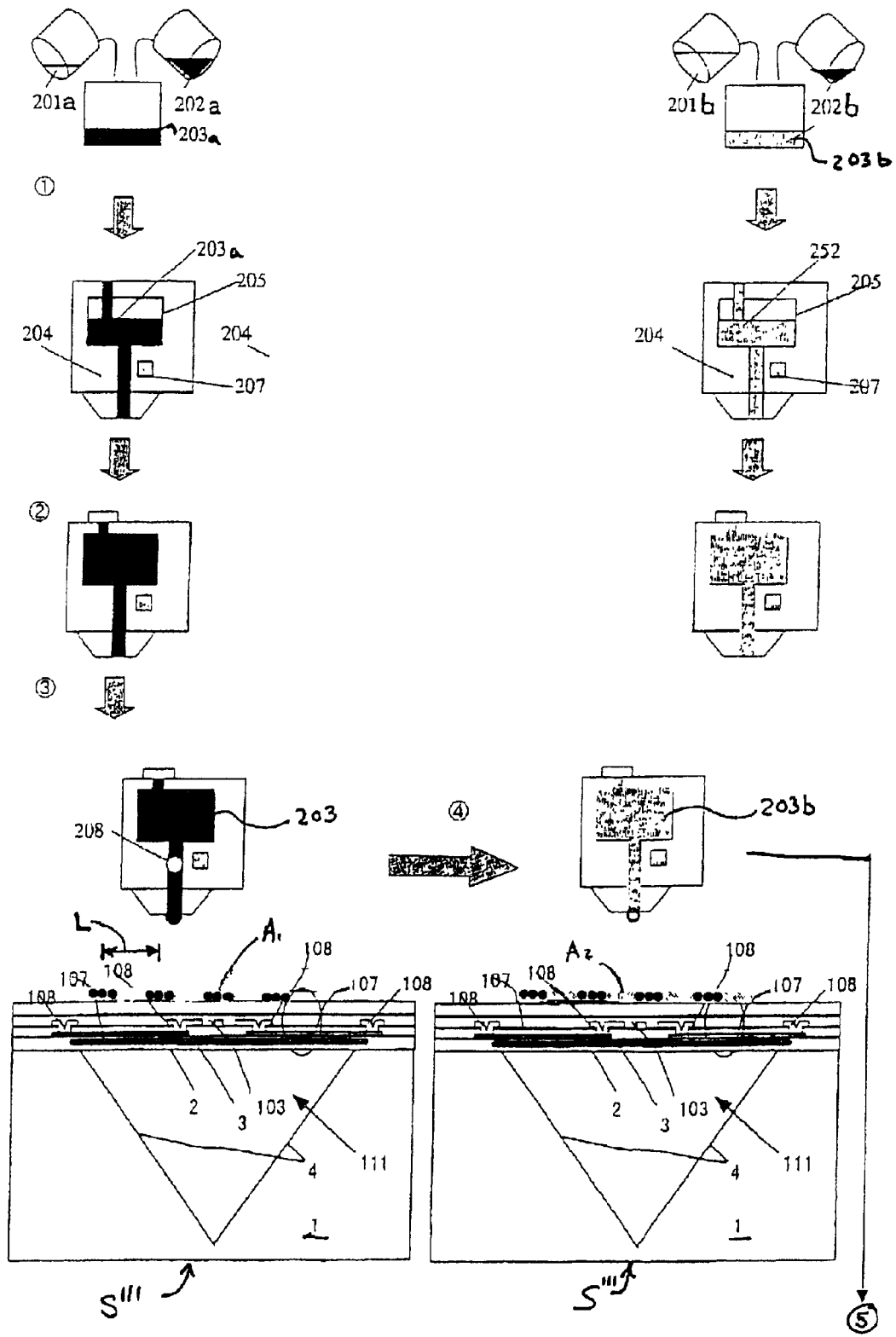
Figure 25:
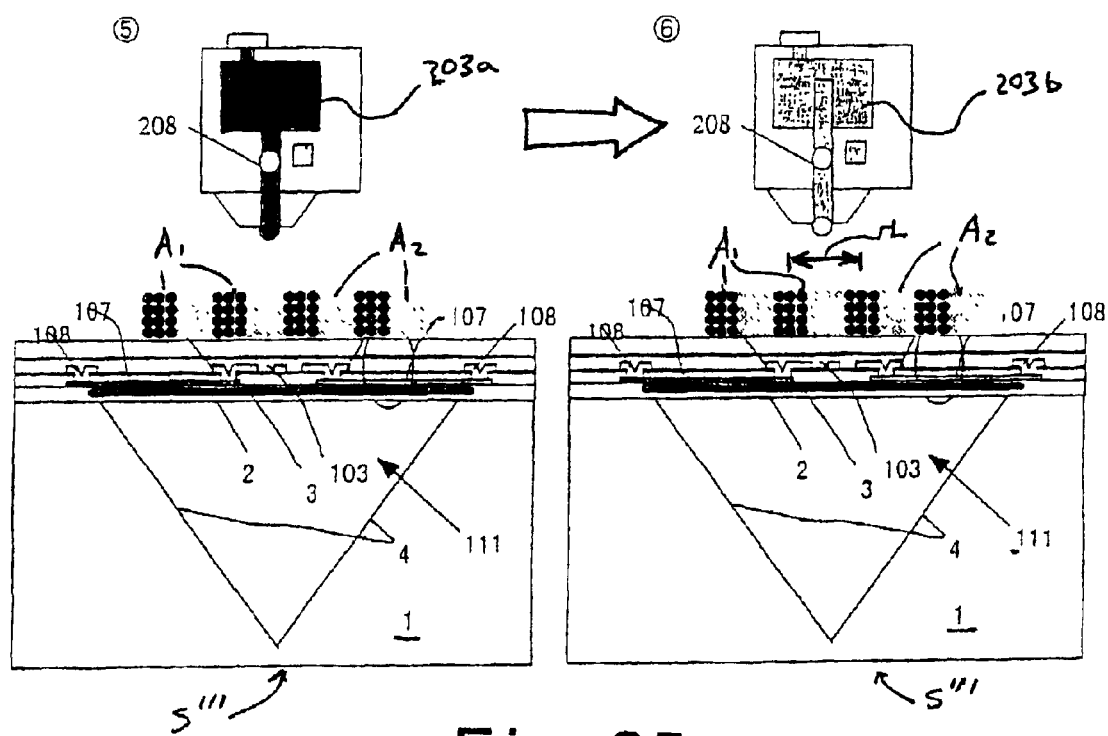
Figure 26:
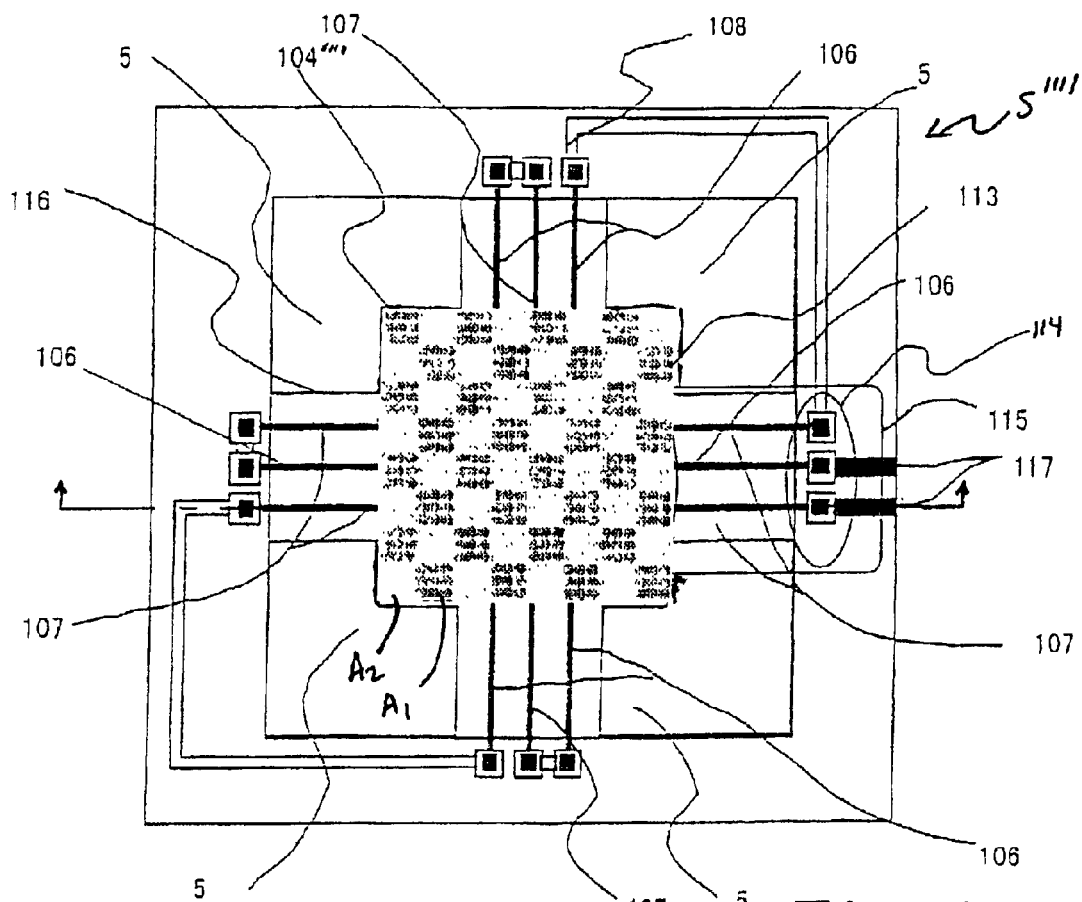
Figure 27:
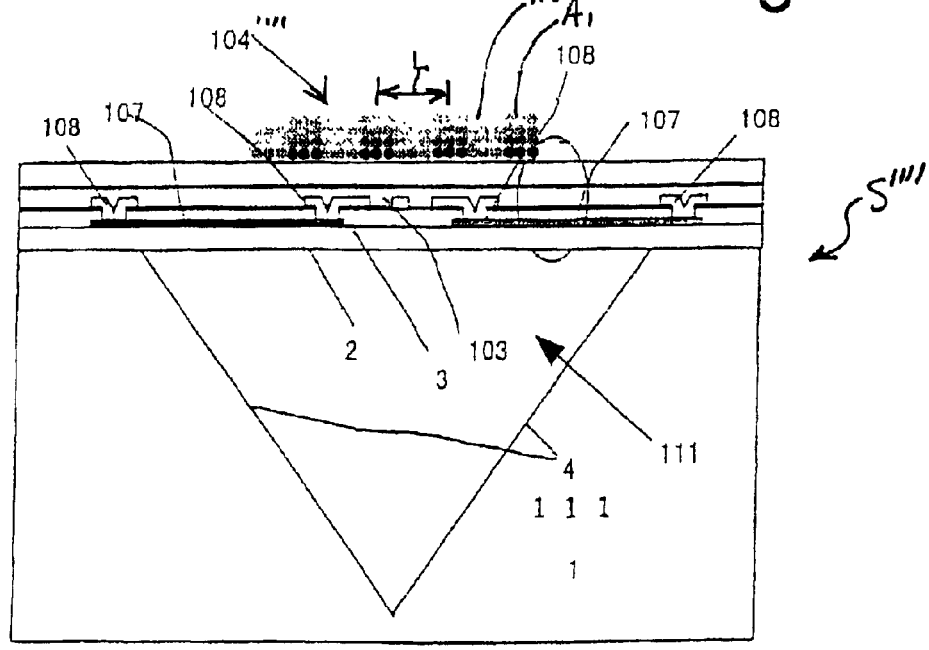
Figure 28:
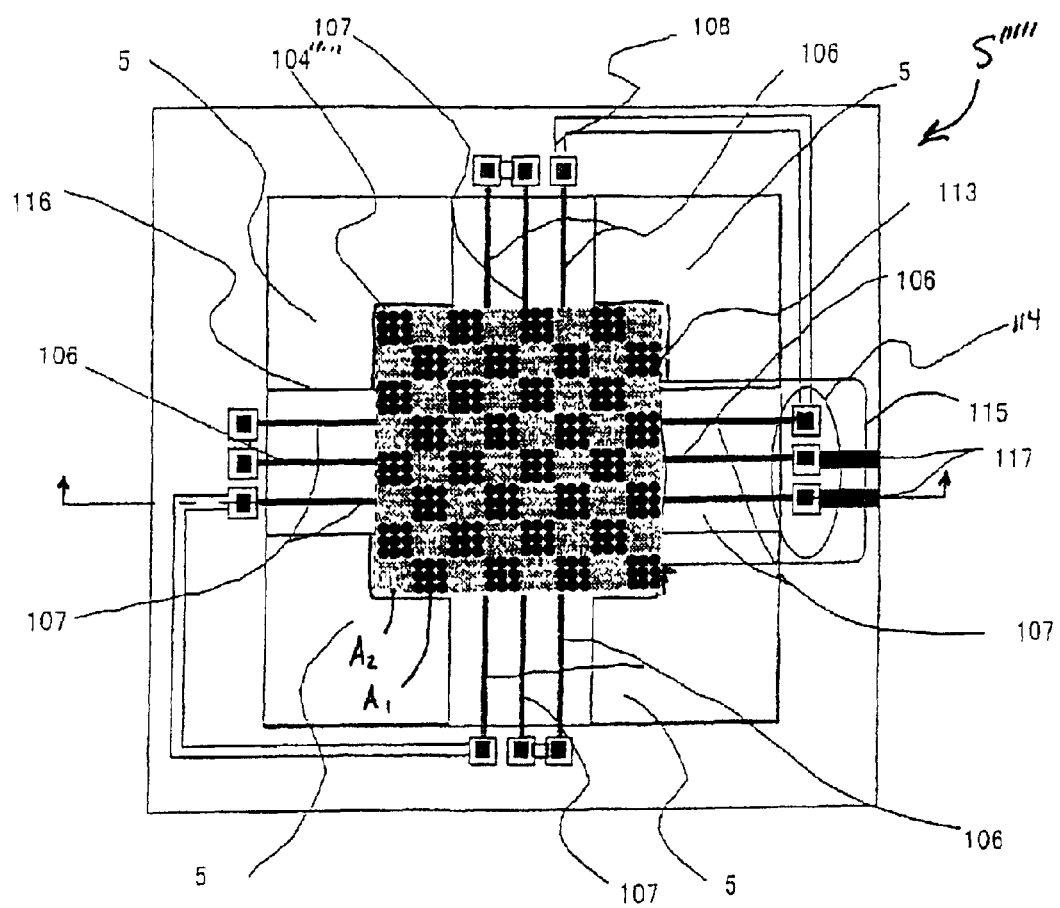
Figure 29:
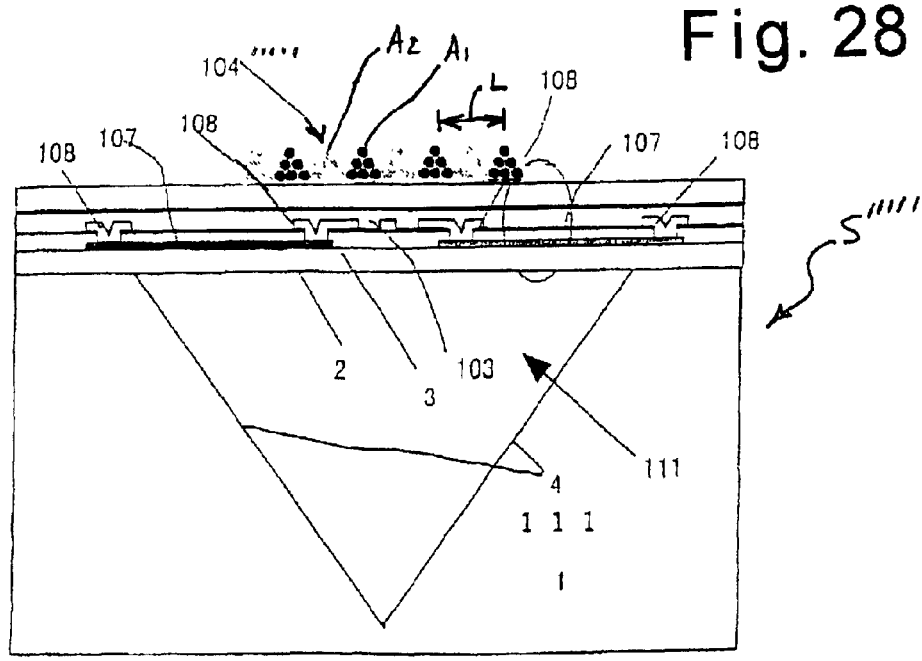

alignment device for manufacturing the thermopile infrared radiation sensor element of FIGS. 1 and 2 in accordance with the present invention;

FIGS. 9 and 10 are sequential schematic views illustrating a manufacturing apparatus with an electrical capacitance alignment device for manufacturing the thermopile infrared radiation sensor element of FIGS. 1 and 2 in accordance with the present invention;

FIG. 11 is a diagrammatic top plan view of a thermopile infrared radiation sensor element in accordance with another embodiment of the present invention;

FIG. 12 is a diagrammatic cross sectional view the thermopile infrared radiation sensor element as seen along line 12—12 of FIG. 11, with the various parts and layers being exaggerated for purposes of illustration;

FIG. 13 is a schematic view illustrating a manufacturing method for manufacturing the thermopile infrared radiation sensor element of FIGS. 11 and 12;

FIG. 14 is a diagrammatic top plan view of a thermopile infrared radiation sensor element in accordance with another embodiment of the present invention;

FIG. 15 is a diagrammatic cross sectional view the thermopile infrared radiation sensor element as seen along line 15—15 of FIG. 14, with the various parts and layers being exaggerated for purposes of illustration;

FIGS. 16 and 17 are sequential schematic views illustrating a manufacturing method for manufacturing the thermopile infrared radiation sensor element of FIGS. 14 and 15;

FIGS. 18 and 19 are sequential schematic views illustrating a manufacturing method for manufacturing the thermopile infrared radiation sensor elements of FIGS. 1, 2, 11, 12, 14 and 15;

FIG. 20 is a diagrammatic view of a thermopile infrared radiation detecting device having an array sensor that is formed of a plurality of the thermopile infrared radiation sensor elements of FIGS. 1, 2, 11, 12, 14 and 15 in accordance with the present invention;

FIG. 21 is a partial diagrammatic cross sectional view three of thermopile infrared radiation sensor elements as seen along line 21—21 of FIG. 20, with the various parts and layers being exaggerated for purposes of illustration;

FIG. 22 is a diagrammatic top plan view of a thermopile infrared radiation sensor element in accordance with a first embodiment of the present invention;

FIG. 23 is a diagrammatic cross sectional view the thermopile infrared radiation sensor element as seen along line 23—23 of FIG. 22, with the various parts and layers being exaggerated for purposes of illustration;

FIGS. 24 and 25 are sequential schematic views illustrating a manufacturing method for manufacturing the thermopile infrared radiation sensor element of FIGS. 22 and 23;

FIG. 26 is a diagrammatic top plan view of a thermopile infrared radiation sensor element in accordance with a first embodiment of the present invention;

FIG. 27 is a diagrammatic cross sectional view the thermopile infrared radiation sensor element as seen along line 27—27 of FIG. 26, with the various parts and layers being exaggerated for purposes of illustration; and FIG. 28 is a diagrammatic top plan view of a thermopile infrared radiation sensor element in accordance with a first embodiment of the present invention;

FIG. 29 is a diagrammatic cross sectional view the thermopile infrared radiation sensor element as seen along line 29—29 of FIG. 28, with the various parts and layers being exaggerated for purposes of illustration.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Various embodiments of the present invention are described below in detail based on the attached drawings. In the drawings described below, the parts of the embodiments that have identical functions are indicated with identical reference symbols to avoid unnecessary repetition of the descriptions of the parts of the embodiments that have identical functions.

Referring initially to FIGS. 1 and 2, a thermopile infrared radiation sensor element S is illustrated in accordance with a first embodiment of the present invention. The thermopile infrared radiation sensor element S illustrated in FIGS. 1 and 2 is preferably manufactured using the method illustrated in FIG. 3. The thermopile infrared radiation sensor element S can be combined together with additional thermopile infrared radiation sensor elements to form an array sensor of an infrared radiation detecting device. For example, several sensor elements S can be grouped together to form an array sensor of an infrared radiation detecting device that is installed in a vehicle to detect the occupants so as to control the climate in the vehicle.

The thermopile infrared radiation sensor element S basically comprises a silicon substrate 1, a nitride membrane or film 2 overlying the main plane of the silicon substrate 1, an oxide film 3, a thermal separation plane 4, an etching hole 5, an oxide film 103, aluminum wiring 108, a hot junction 113, a cold junction 114, a beam or rib 116, and an output terminal 117. The thermopile infrared radiation sensor element S further comprises a thermal separation region 111 formed within the silicon substrate 1, a thermopile 115 formed on the membrane 2, and an infrared radiation absorbing film 104 on the uppermost surface. The thermopile 115 comprises p-type silicon layers 106 and n-type silicon layers 107 connected in series.

The infrared radiation absorbing film 104 of the thermopile infrared radiation sensor element S is constructed to convert incident infrared radiation with an intensity and a predetermined wavelength λ into thermal energy, and detect the intensity of the incident infrared radiation. The infrared radiation absorbing film 104 includes an infrared radiation incident surface with a plurality of first surface areas having first refractive indices arranged in a predetermined pattern relative to a plurality of second surface areas having second refractive indices that are different from the first refractive indices of the first surface areas. The first and second surface areas of the infrared radiation absorbing film 104 are configured and arranged in the predetermined pattern to increase infrared radiation absorptance of the infrared radiation absorbing film.

In particular, in this embodiment, the infrared radiation incident surface of the infrared radiation absorbing film 104 is uneven to form a three dimensional surface that decreases the effective surface reflectance cause by interference or scattering effects. Preferably, the infrared radiation absorbing film 104 has a plurality of extremely thick portions or points forming the first surface areas with the first refractive indices and a plurality of extremely thin portions or points forming the second surface areas with second refractive indices that are the same as the first refractive indices. It will be apparent from this disclosure that the thin points or second surface areas can be formed with second refractive indices that are different (i.e., one being lower than the other) from the first refractive indices of the thick points or first surface areas. Each of the thick points has a first film thickness, while each of the thin points has a second film thickness. The thick points are arranged in a predetermined pattern relative to the thin points. In other words, the thick and thin points are configured and arranged such that a predetermined film thickness difference is formed between the thick and thin points and a predetermined spacing within a plane is formed between the thick points. The predetermined spacing and the predetermined film thickness difference are arranged and configured to decrease the effective surface reflectance cause by interference or scattering effects.

The infrared radiation absorbing film 104 has a refractive index of n and has on its surface protrusions and depressions having height difference (film thickness difference) D and spacing L roughly equal to wavelength λ. The film thickness difference D is equal to λ/4.

Next, the operation of the thermopile infrared radiation sensor element S will be described. When infrared radiation strikes the infrared radiation incident surface of the infrared radiation absorbing film 104, some of the infrared radiation reflects from the infrared radiation absorbing film 104 according to R=[(n−1/n+1)]2. However, in the illustrated embodiment, the light reflected from the protrusions (the thick points) and the light reflected from the depressions (thin points) are out of phase and cancel each other out by interference because the light path of the light reflected from the protruded portions differs from the light path of the light reflected from the depressed portions by an amount equal to about λ/2. The effective surface reflectance is thus greatly reduced and the infrared radiation absorptance is improved. In order for the light reflected from the protruded portions and the light reflected from the depressed portions to undergo interference, it is preferred that the planar distance between them be less than or equal to the predetermined wavelength λ to be measured and it is required that the planar distance not exceed twice the predetermined wavelength λ to be measured, i.e., 2λ. For example, when the predetermined wavelength λ to be measured is 10 μm, which is used for human body detection, then the film thickness difference D is about 2.5 μm and the spacing L is about 10 μm for this type of sensor.

As previously explained, the first embodiment is an infrared radiation detecting device that has an the infrared radiation absorbing film 104, converts incident infrared energy into thermal energy at the infrared radiation absorbing film 104, and detects the intensity of the incident infrared radiation. As shown in FIG. 2, the infrared radiation absorbing film 104 has a plurality of extremely thick portions or points and a plurality of extremely thin portions or points with the film thickness difference between the extremely thick portions and the extremely thin portions and the spacing between the extremely thick portions within the same plane are set such that interference or scattering effects cause the effective reflectance to decrease. The film thickness difference between the plurality of extremely thick portions and extremely thin portions is equal to ¼ of the wavelength of the infrared radiation being measured or greater than ¼ of the same and the spacing between the plurality of the extremely thick portions within the same plane is shorter than the wavelength of the infrared radiation being measured. Therefore, the light reflected from the extremely thick portions and the light reflected from the extremely thin portions of the infrared radiation absorbing film 104 interfere with each other, making it possible to reduce the surface reflectance and increase the infrared radiation absorptance of the infrared radiation absorbing film 104. Moreover, the infrared radiation absorptance can also be increased by means of the reflected light being scattered and undergoing multiple reflections in accordance with the three-dimensional structure of the surface.

Discharging Device 204

Figure 3:
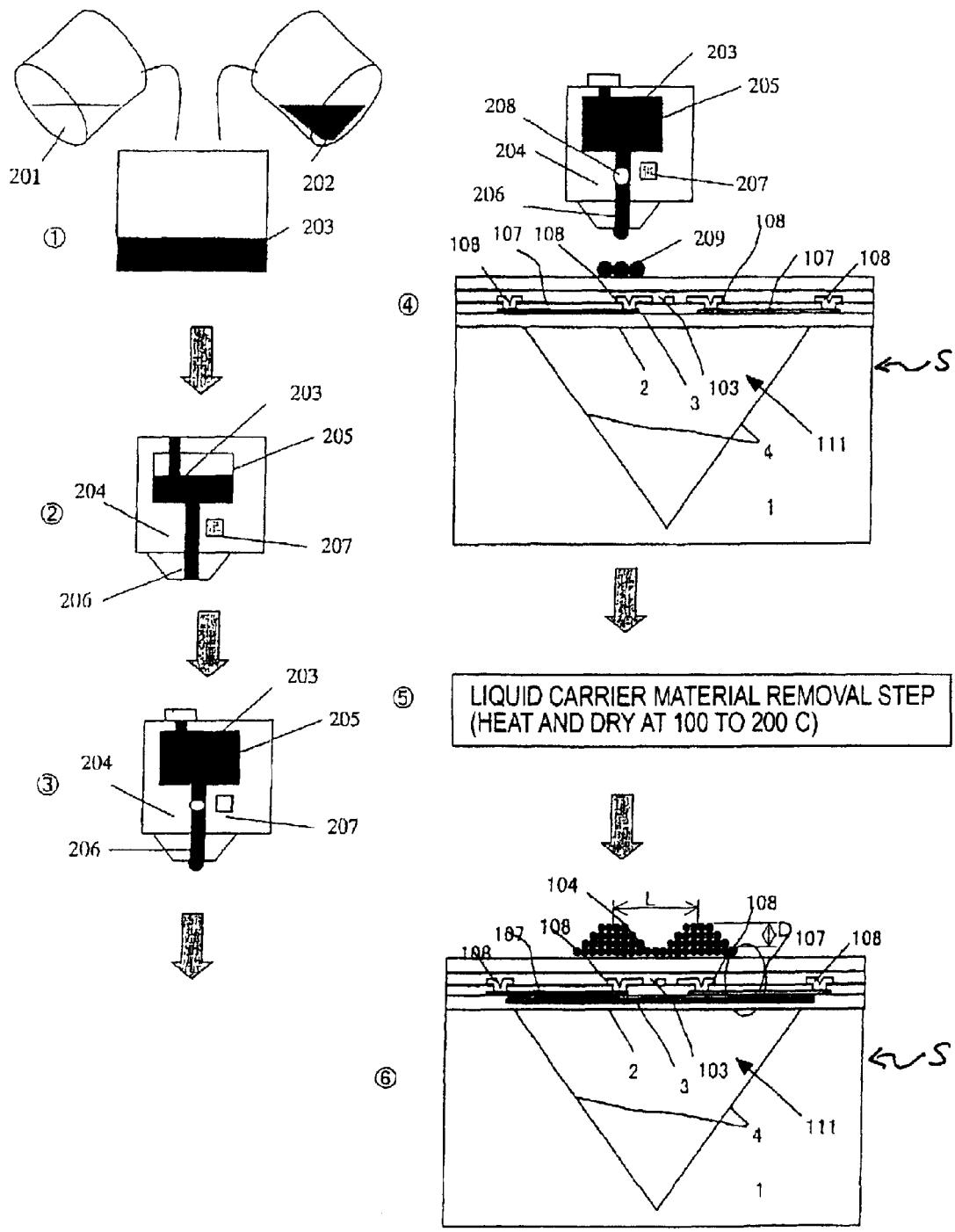
FIG. 3 is a schematic view illustrating a manufacturing method for manufacturing the thermopile infrared radiation sensor element of FIGS. 1 and 2.

Referring now to FIG. 3, the method for manufacturing the thermopile infrared radiation sensor element S of FIGS. 1 and 2 will now be discussed. In it simplest form, the thermopile infrared radiation sensor element S is formed using a discharging device 204 having a pressure chamber 205 with a discharge opening 206 and a heating device 207 as diagrammatically illustrated in step ② of FIG. 3. One example of a suitable discharging device for carrying out the present invention is an inkjet system such as an ink jet printer that is programmed to print on the silicon substrate 1 in the predetermined pattern and spacing to produce the infrared radiation absorbing film 104 having the prescribed shape in accordance with the present invention. In any event, the discharging device 204 includes a microprocessor that is programmed to apply infrared radiation absorbing material on the silicon substrate 1 in the predetermined pattern and spacing to produce the infrared radiation absorbing film 104 having the prescribed shape as disclosed in the various embodiments described herein.

Preferably, the discharging device 204 is utilizes in the following manner to produce the thermopile infrared radiation sensor element S of FIGS. 1 and 2. First, an infrared radiation absorbing substance 202 with a prescribed refractive index and a liquid carrier material 201 with a prescribed viscosity are evenly mixed together to make a combined liquid mixture 203 as diagrammatically illustrated in step ③ of FIG. 3. Examples of some suitable materials for the infrared radiation absorbing substance 202 include, but not limited to, carbon particles, manganese dioxide ($MnO_2$), chromium oxide ($Cr_2O_3$), iron oxide ($Fe_2O_3$), cobalt oxide (CoO), copper oxide (CuO), zirconia ($ZrO_2$), alumina ($Al_2O_3$), titania ($TiO_2$), zircon ($ZrO_2$-$SiO_2$), and sintered silica ($SiO_2$). Examples of some suitable materials for the liquid carrier material 201 include, but not limited to, silicon resin, water glass, and alcohol solutions. The combined liquid mixture 203 is put into the pressure chamber 205 of the discharging device 204 as diagrammatically illustrated in step ② of FIG. 3.

Next, the discharging device 204 is positioned above a prescribed portion of the sensor element S. Once the discharging device 204 is in the correct position, the heating device 207 is heated, such that the pressure of the pressure chamber 205 is increased to form a bubble 208 in the combined liquid mixture 203. Simultaneously with this pressure increase, the combined liquid mixture 203 drips from the discharge opening 206 as a discharge material 209. The discharge material 209 is deposited onto the upper surface of the sensor as diagrammatically illustrated in steps ④ and ⑥ of FIG. 3.

The combined liquid mixture 203 is repeatedly deposited as the discharge material 209 so as to create the protrusions (the thick points) and the depressions (thin points) with the protrusions (the thick points) having the predetermined spacing L and the predetermined film thickness difference D as diagrammatically illustrated in step ⑥ of FIG. 3.

Between these repeated operations, a liquid carrier material removal step is performed for removing the liquid carrier material 201 from the discharge material 209 as diagrammatically illustrated in step ⑤ of FIG. 3. This liquid carrier material removal step is performed as required so as to form the infrared radiation absorbing film 104 having the prescribed shape of protrusions (the thick points) and depressions (thin points). The liquid carrier material removal step is preferably carried out by using heat or light irradiation on the discharge material 209 to remove the liquid carrier material 201 therefrom.

In the method just described, the manufacturing of infrared radiation detecting devices of first embodiment can be summarized in the following manner. First, a mixing step is performed in which the infrared radiation absorbing substance 202 and the liquid carrier material 201 are mixed together to form the combined liquid mixture 203 to be discharged as the discharge material 209. Second, a filling step is performed in which the pressure chamber 205 is filled with the combined liquid mixture 203. Third, a discharge step in which the combined liquid mixture 203 is discharged from the discharge opening 206 at least two times by adjusting the pressure inside the pressure chamber 205 to deposit the discharge material 209 on a prescribed infrared radiation absorbing film formation region of the infrared radiation detecting device so as to form an infrared radiation absorbing film 104 having a non-uniform film thickness distribution. Fourth, a removal step in which the liquid carrier material 201 is removed from the discharge material 209. Since a prescribed volume of a liquid carrier material 201 having an appropriate viscosity is discharged a plurality of times from the discharge opening 206, the infrared radiation absorbing film 104 having a three-dimensional shape, a small surface reflectance, and a large infrared radiation absorptance can be manufactured inexpensively and at a good yield. Moreover, the order of the steps can be determined freely because the infrared radiation absorbing film 104 can be formed in any position under atmospheric conditions.

Figure 4:
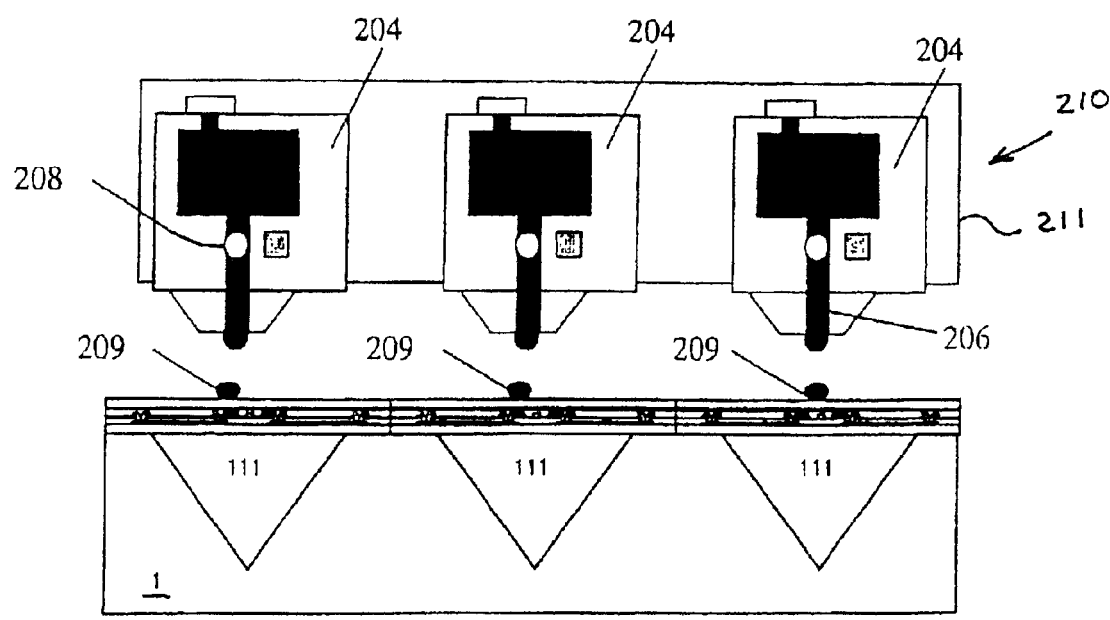
FIG. 4 is a schematic view illustrating a manufacturing method for simultaneously manufacturing a plurality of the thermopile infrared radiation sensor element of FIGS. 1 and 2 for forming an array sensor of a thermopile infrared radiation detecting device in accordance with the present invention.

Manufacturing Apparatus of FIG. 4

Referring now to FIG. 4, a manufacturing apparatus 210 is illustrated for simultaneously manufacturing the infrared radiation absorbing films 104 for a plurality of the infrared radiation sensor elements used for image acquisition such as the infrared radiation sensor element S illustrated in FIGS. 1 and 2. The manufacturing apparatus 210 can be used to manufacture an infrared radiation detecting device having an array sensor provided with a plurality of sensing regions in which an infrared radiation absorbing film is formed. In other words, the manufacturing apparatus 210 can be used to form the infrared radiation absorbing film 104 of a one-dimensional or two-dimensional array sensor used for image acquisition. The manufacturing apparatus 210 serves as an example of improving productivity and alignment precision by discharging mixture liquid onto a plurality of sensor elements simultaneously.

The manufacturing apparatus 210 includes a plurality of the discharging devices 204 mounted on a single carrier 211. The discharging devices 204 are mounted on the carrier 211 such that the predetermined spacing between adjacent ones of the pressure chambers 205 is an integer multiple of the pixel pitch of the array sensor. Thus, the manufacturing apparatus 210 makes it possible to discharge to a plurality of pixels simultaneously. In FIG. 4, the predetermined spacing between adjacent ones of the pressure chamber 205 is set to 1, i.e., equal to, the pixel pitch of the array sensor such that the liquid mixture can be discharged to three pixels simultaneously. This arrangement makes it possible to improve the productivity and alignment precision.

The pressure chambers 205 of the manufacturing apparatus 210 operate in the same manner as the single pressure chamber 205 illustrated in FIG. 3. Thus, the manufacturing apparatus 210 has a plurality discharge openings 206 with the spacing between the discharge openings 206 being the same as the pixel spacing of the infrared radiation detecting device or is an integer multiple of the pixel spacing. Consequently, the infrared radiation absorbing film 104 (FIGS. 1 and 2) of the entire array sensor or a portion of an individual sensor can be formed with a single alignment to improve productivity and alignment precision. Thus, the manufacturing apparatus 210 can be used to manufacture an infrared radiation detecting device having an array sensor provided with a plurality of sensing regions in which an infrared radiation absorbing film is formed.

In the manufacturing apparatus 210 just described, the simultaneous manufacturing of the infrared radiation absorbing films 104 for a plurality of the infrared radiation sensor elements S of first embodiment can be summarized in the following manner. First, a mixing step is performed in which the infrared radiation absorbing substance 202 and the liquid carrier material 201 are mixed together to form the combined liquid mixture 203 to be discharged as the discharge material 209. Second, a filling step is performed in which the pressure chambers 205 are filled with the combined liquid mixture 203. Third, a discharge step in which the combined liquid mixture 203 is discharged from the discharge openings 206 of each of the pressure chambers 205 at least two times by adjusting the pressure inside the pressure chambers 205 to simultaneously deposit the discharge material 209 at a plurality of locations on a prescribed infrared radiation absorbing film formation region of the infrared radiation detecting device so as to form the infrared radiation absorbing film 104 with a non-uniform film thickness distribution as seen in FIGS. 1 and 2. Fourth, a removal step in which the liquid carrier material 201 is removed from the discharge material 209.

Figure 5:
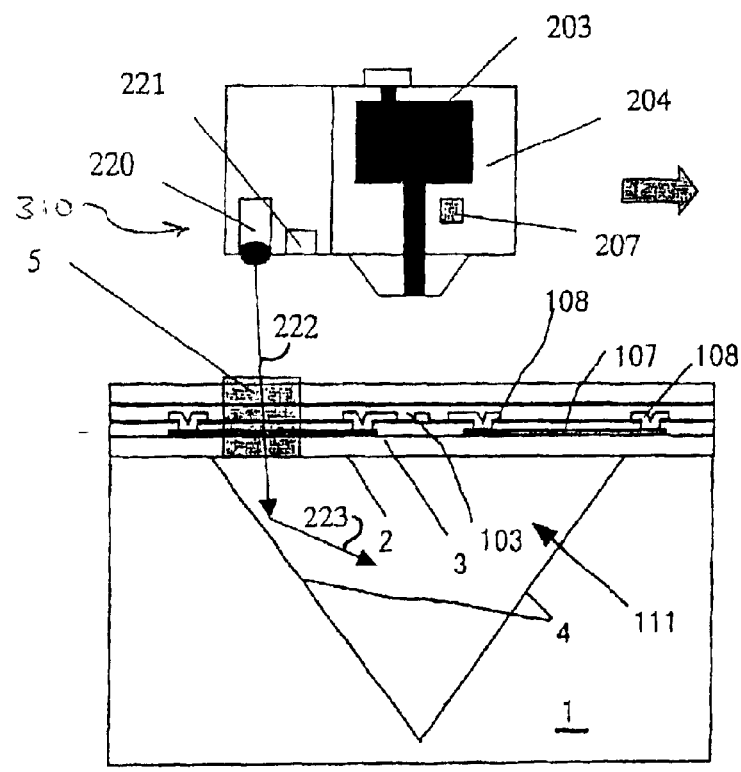
FIGS. 5 and 6 are sequential schematic views illustrating a manufacturing apparatus with an optical alignment device for manufacturing the thermopile infrared radiation sensor element of FIGS. 1 and 2 in accordance with the present invention.
Figure 6:
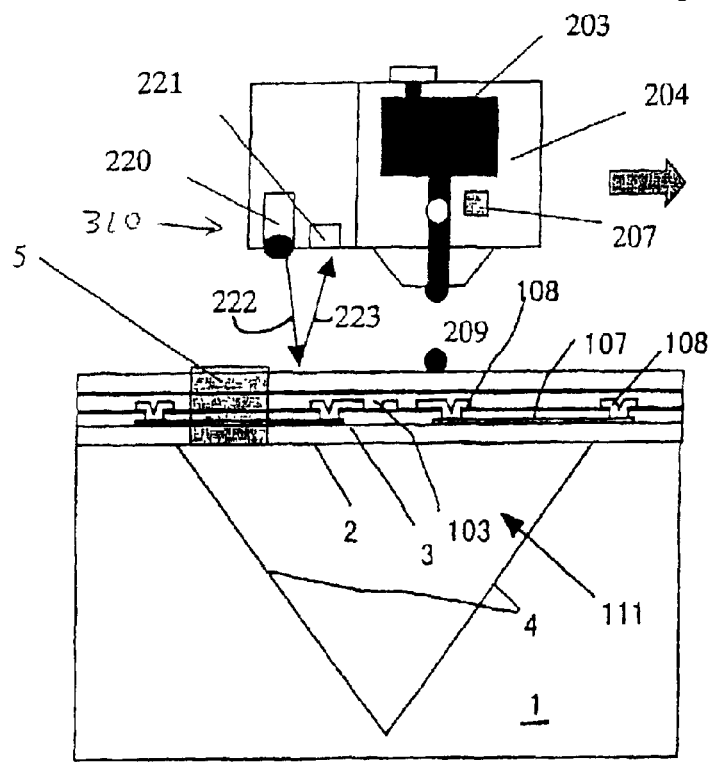

Manufacturing Apparatus of FIGS. 5 and 6

Referring now to FIGS. 5 and 6, a manufacturing apparatus 310 is illustrated for manufacturing the infrared radiation absorbing film 104 of the infrared radiation sensor element S illustrated in FIGS. 1 and 2. Basically, the manufacturing apparatus 310 uses the discharging device 204 of FIG. 3 with an optical alignment device operatively coupled thereto. The manufacturing apparatus 310 is designed to improve the discharge alignment precision using the optical alignment device. The optical alignment device is only diagrammatically illustrated, since the particular structure of the optical alignment device is not critical to this aspect of the present invention. Thus, the manufacturing apparatus 310 includes the discharging device 204, discussed above, with the discharge opening 206 of the pressure chamber 205 being accurately positioned by the optical alignment device.

The optical alignment device basically comprising a surface emitting laser diode 220 and a photodiode 221. The surface emitting laser diode 220 serves as a light emitting body, while the photodiode 221 serves as a photosensor that detects the surface state of a measured body based on the change in reflectance of the surface with respect to light irradiated thereon from the surface emitting laser diode 220 as explained below. Since the position of the end part of the infrared radiation absorbing film 104 to be formed can be measured accurately, the discharge material 209 can be discharged to an accurate position and the infrared radiation absorbing film 104 (FIG. 1) can be formed with a high degree of precision.

In operation of the optical alignment device, the surface emitting diode 220 emits a light beam 222 that strikes the upper surface of the sensor element S. The direction and intensity of the resulting reflected light beam 223 from the light beam 222 differs depending on the surface shape of the sensor element S. In FIG. 5, the emitted light beam 222 passes through the etching hole used for thermal separation and strikes a lateral wall of the substrate 1. This lateral wall is set at an angle of 54.7 degrees with respect to the main upper surface of the substrate 1. Consequently, the emitted light beam 222 reflects as a reflected light beam 223 in the manner shown in FIG. 5 without reaching the photodiode 221. Meanwhile, in the case shown in FIG. 6, the emitted light beam 222 reflects at the upper surface of the sensor element S almost in the same manner as a mirror surface reflection. Thus, the reflected light beam 223 strikes the photodiode 221 to indicate the position of the sensor element S relative to the discharging device 204. By scanning the discharging device 204 parallel to the main upper surface of the substrate 1 in this manner, the position at the center part of the sensor element S where the infrared radiation absorbing film 104 will be formed can be detected and the alignment precision improved.

Figure 7:
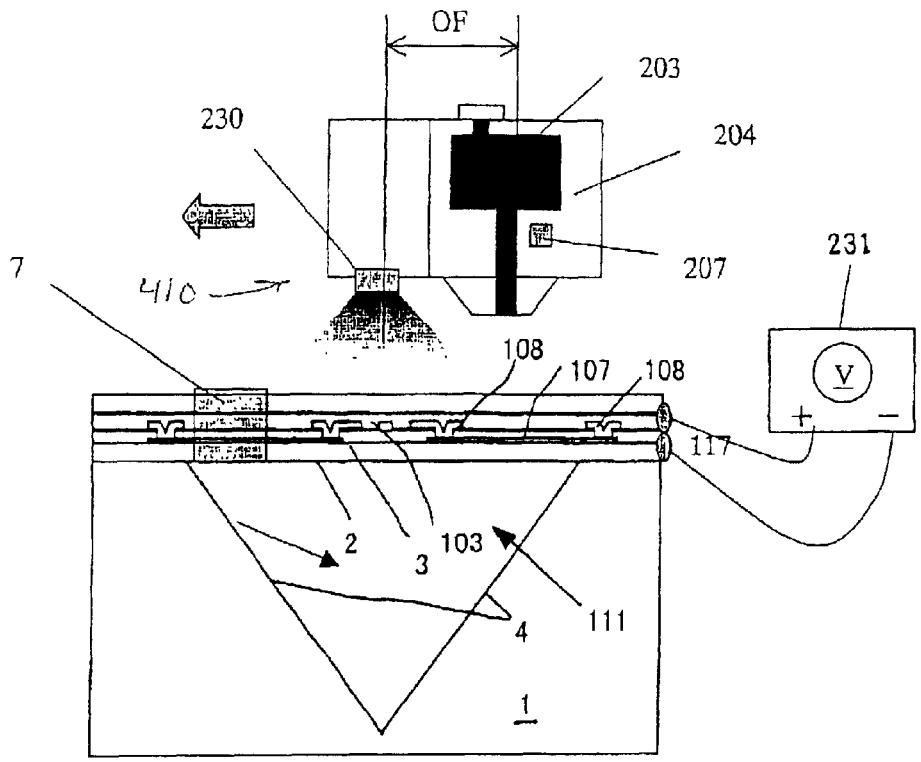
FIGS. 7 and 8 are sequential schematic views illustrating a manufacturing apparatus with a heat (infrared radiation)
Figure 8:
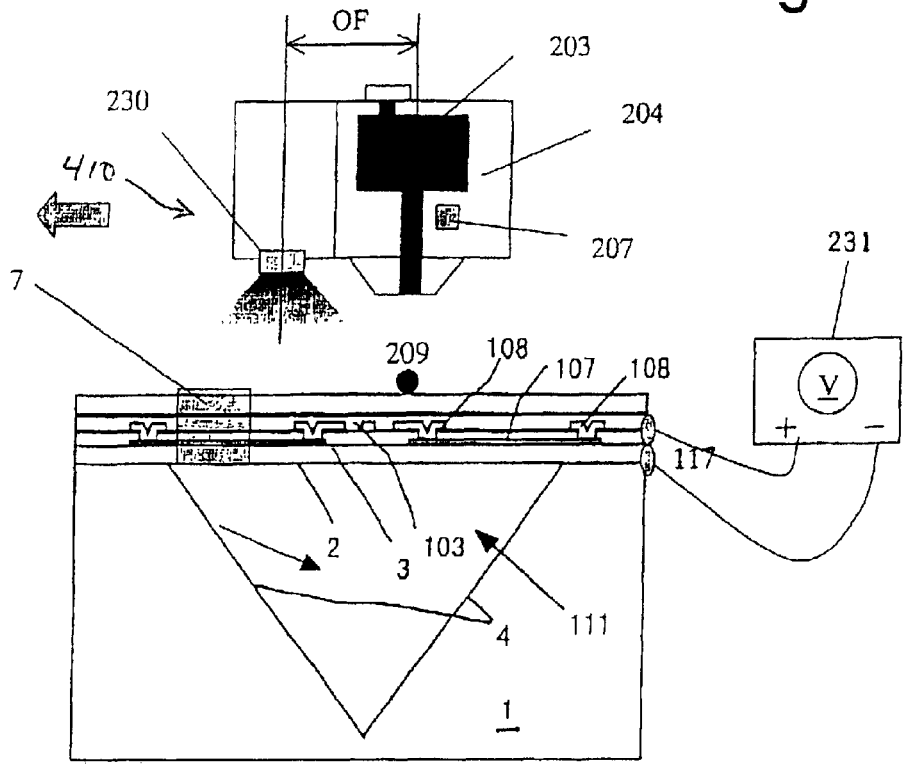

Manufacturing Apparatus of FIGS. 7 and 8

Referring now to FIGS. 7 and 8, a manufacturing apparatus 410 is illustrated for manufacturing the infrared radiation absorbing film 104 of the infrared radiation sensor element S illustrated in FIGS. 1 and 2. Basically, the manufacturing apparatus 410 uses the discharging device 204 of FIG. 3 with an heat alignment device operatively coupled thereto. In other words, instead of using the optical alignment device of FIGS. 5 and 6, the heat alignment device is used to improve the alignment precision of the discharging device 204 of FIG. 3. Basically, the heat alignment device using a heat emitting body 230 to generate infrared radiation and a voltmeter 231 that monitors the sensor output the infrared radiation sensor element S.

As previously mentioned, the manufacturing apparatus 410 includes the discharging device 204, discussed above, with the discharge opening 206 of the pressure chamber 205 being accurately positioned by the heat alignment device. The heat emitting body 203 serves as a heating device that is provided in or in the vicinity of discharge opening 206. The voltmeter 231 serves as a device for detecting the output signal value of a pixel of an infrared radiation detecting device. Since the position of the end part of the infrared radiation absorbing film to be formed can be measured accurately, the discharge material can be discharged to an accurate position and the infrared radiation absorbing film 104 (FIG. 1) can be formed with a high degree of precision. Moreover, even after the detecting device is mounted, position adjustment can be performed and the sensitivity can be revised.

Since the infrared radiation sensor element S is already designed to detect infrared radiation, the infrared radiation sensor element S can easily monitor the intensity of the infrared radiation and then output the intensity of the detected infrared radiation to find the position (or, more precisely, the distance from the center) of the heat emitting body 230 and the position of the discharging device 204. Furthermore, by combining scan direction data, it is also possible to identify the absolute position of the heat emitting body 203. Since the pressure chamber 205 and heat emitting body 203 are separated by offset values OF in all directions (i.e., the x-y-z coordinate directions), these offsets must be taken into consideration when identifying the position of discharge opening 206 of the discharging device 204.

Manufacturing Apparatus of FIGS. 9 and 10

Referring now to FIGS. 9 and 10, a manufacturing apparatus 510 is illustrated for manufacturing the infrared radiation absorbing film 104 of the infrared radiation sensor element S illustrated in FIGS. 1 and 2. Basically, the manufacturing apparatus 510 uses the discharging device 204 of FIG. 3 with an electrical capacitance alignment device operatively coupled thereto. In other words, instead of using the optical alignment device of FIGS. 5 and 6, the electrical capacitance alignment device is used to improve the alignment precision of the discharging device 204 of FIG. 3 by measuring the electrical capacitance between the pressure chamber 205 and the infrared radiation sensor element S.

The manufacturing apparatus 510 includes an electrical capacitance meter 241 connected between the discharging device 204 and the sensor element S. The discharge opening 206 of the pressure chamber 205 for the discharging device 204, discussed above, is accurately positioned by the electrical capacitance alignment device.

In particular, the electrical capacitance meter 241 measures the electrical capacitance between the discharging device 204 and the sensor element S. The position of the discharge opening 206 of the discharging device 204 can be identified relative to the sensor element S because the electrical capacitance is largest when the opposing surface areas are largest, i.e., when the discharging device 204 is at the center of the sensor element S. The electrical capacitance meter 241 serves as a device for detecting the electrical capacitance of an infrared radiation detecting device. Since the position of the end part of the infrared radiation absorbing film to be formed can be measured accurately, the discharge material can be discharged to an accurate position and the infrared radiation absorbing film 104 (FIG. 1) can be formed with a high degree of precision.

Thermopile Infrared Radiation Detecting Element S'

Referring now to FIGS. 11 and 12, a thermopile infrared radiation detecting device or sensor element S' is illustrated in accordance with another embodiment of the present invention. The thermopile infrared radiation sensor element S' illustrated in FIGS. 11 and 12 is preferably manufactured using the method illustrated in FIG. 13.

The thermopile infrared radiation sensor element S' is identical to the thermopile infrared radiation sensor element S, discussed above, except for the formation of the infrared radiation absorbing film. Thus, the parts of the thermopile infrared radiation sensor element S' that have identical functions to the thermopile infrared radiation sensor element S, discussed above, are indicated with identical reference symbols to avoid unnecessary repetition of the descriptions of the parts of the embodiments that have identical functions.

An object of the thermopile infrared radiation sensor element S' is to improve the effective absorptance by adding to the features of the thermopile infrared radiation sensor element S, discussed above. In particular, the infrared radiation absorbing film 104' of the thermopile infrared radiation sensor element S' has a non-uniform refractive index between its infrared radiation incident surface where the infrared radiation strikes and its infrared radiation emission surface where the infrared radiation exits. Preferably, the non-uniform refractive index varies in a continuous manner between the infrared radiation incident surface and the infrared radiation emission surface. The infrared radiation incident surface of the infrared radiation absorbing film 104' has a refractive index that is lower than the refractive index of the infrared radiation emission surface of the infrared radiation absorbing film 104'. In other words, the refractive index of the infrared radiation absorbing film 104' decreases in a monotonous manner as one moves in the upward direction in the figure, which further reduces the reflectance. Accordingly, the refractive index of the infrared radiation absorbing film 104' is not uniform with respect to the direction of the film thickness but, instead, varies in a continuous manner in the transverse direction. As a result, since the refractive index is low at the infrared radiation incident surface, the effective surface reflectance can be reduced and the infrared radiation absorptance can be increased.

Referring now to FIG. 13, a method for manufacturing the thermopile infrared radiation sensor element S' shown in FIGS. 11 and 12 is illustrated. Since the basic manufacturing method is the same as that shown in FIG. 3, only the differences will be discussed herein to avoid unnecessary repetition of the descriptions of the parts/steps that have identical functions/operations.

In it simplest form, the thermopile infrared radiation sensor element S' is formed using a discharging device 204 having a pressure chamber 205 with a discharge opening 206 and a heating device 207 as diagrammatically illustrated in steps ②–④ of FIG. 13. The microprocessor of the discharging device 204 is programmed to apply infrared radiation absorbing material on the silicon substrate 1 in the predetermined pattern and spacing to produce the infrared radiation absorbing film 104' having the prescribed shape as shown in FIGS. 11 and 12.

In this method, first, the liquid carrier material 201 having a prescribed viscosity is evenly mixed with the infrared radiation absorbing substance 202 that has one or more infrared radiation absorbing substances with different prescribed refractive indices to make a combined liquid mixture 203 as diagrammatically illustrated in step ① of FIG. 13. Next, the discharging device 204 is positioned above a prescribed portion of the sensor element S. The combined liquid mixture 203 is repeatedly deposited as the discharge material 209 so as to create the protrusions (the thick points) and the depressions (thin points) with the protrusions (the thick points) having the predetermined spacing L and the predetermined film thickness difference D as diagrammatically illustrated in step ⑥ of FIG. 13.

The combined liquid mixture 203 is sequentially discharged as a single discharge material 209 without removing the liquid carrier material 201 for a predetermined amount of time, e.g., the discharge material 209 allowed to sit for a prescribed amount of time, e.g., one day. When the discharge material 209 is sitting on the thermopile, the infrared radiation absorbing substance 202 precipitates and coagulates in the downward direction of FIG. 13 because the infrared radiation absorbing substance 202 has a specific weight that is larger than that of the liquid carrier material 201. As a result, the concentration of the infrared radiation absorbing substance 202 at the infrared radiation incident surface decreases relative to the infrared radiation emission surface in which the concentration of the infrared radiation absorbing substance 202 increases. Thus, the refractive index on the infrared radiation emission surface or substrate side increases relative to the infrared radiation incident surface. This graduated state of the infrared radiation absorbing substance 202 is fixed by executing the liquid carrier material removal step after the desired graduated state has been reached.

Between the discharge steps and the removal step, a redistribution step in which the concentration distribution of the infrared radiation absorbing substance 202 in the combined liquid mixture 203 (i.e., the discharge material) is changed such that the refractive index on the infrared radiation incident surface of the infrared radiation absorbing film 104' where infrared radiation is incident is lower than the refractive index on the infrared radiation emission surface where infrared radiation is emitted. Since the method has a step in which the concentration of the infrared radiation absorbing substance 202 is redistributed after discharging, the film thickness and refractive index of each layer can be varied in a continuous manner and the infrared radiation absorptance can be increased. In this redistribution step, gravity acts on the infrared radiation absorbing substance 202 in the combined liquid mixture 203 to apply a gravitational force that changes the concentration distribution. Instead of a gravitational force, it is also acceptable to use an electrostatic force or a magnetic force to change the concentration distribution.

Thermopile Infrared Radiation Detecting Element S"

Referring now to FIGS. 14 and 15, a thermopile infrared radiation detecting device or sensor element S" is illustrated in accordance with another embodiment of the present invention. The thermopile infrared radiation sensor element S" is preferably manufactured using the method illustrated in FIGS. 16 and 17.

The thermopile infrared radiation sensor element S" is identical to the thermopile infrared radiation sensor element S, discussed above, except for the formation of the infrared radiation absorbing film. Thus, the parts of the thermopile infrared radiation sensor element S" that have identical functions to the thermopile infrared radiation sensor element S, discussed above, are indicated with identical reference symbols to avoid unnecessary repetition of the descriptions of the parts of the embodiments that have identical functions.

The object of the thermopile infrared radiation sensor element S" is to improve the effective absorptance by adding to the features the thermopile infrared radiation sensor element S. The refractive index at the infrared radiation incident surface of the infrared radiation absorbing film 104" is lower than on the infrared radiation emission surface such that the refractive index decreases in a monotonous manner as one moves in the upward direction in FIGS. 14 and 15, which further reduces the effective surface reflectance.

Thus, the infrared radiation absorbing film 104" has a structure of multiple layers having different refractive indices with the refractive index on the infrared radiation incident side of the infrared radiation absorbing film 104" where infrared radiation is incident is lower than the refractive index on the infrared radiation emission side where infrared radiation is emitted. As a result, since the refractive index is low at the infrared radiation incident surface, the effective surface reflectance can be reduced and the infrared radiation absorptance can be increased. Also, since the refractive index and film thickness of each layer can be optimized, the infrared radiation absorptance can be increased even further.

Referring now to FIGS. 16 and 17, a method for manufacturing the thermopile infrared radiation sensor element S" shown in FIGS. 14 and 15 is illustrated. Since the basic manufacturing method is the same as that shown in FIG. 3, only the differences will be discussed herein to avoid unnecessary repetition of the descriptions of the parts/steps that have identical functions/operations.

In it simplest form, the thermopile infrared radiation sensor element S" is formed using a plurality of the discharging devices 204 that have the pressure chambers 205 with the discharge openings 206 and the heating devices 207. The discharging devices 204 are discussed above in more detail with reference to FIG. 3. However, in this embodiment, a plurality (four types illustrated) of combined liquid mixtures 203, 250, 251 and 252 are prepared with each of the liquid mixtures 203, 250, 251 and 252 having a different refractive index. This can be accomplished in a variety of ways. For example, this can be accomplished by varying the concentration of the infrared radiation absorbing substance or using different materials. The liquid mixture 203 having the largest refractive index is discharged first. Then, other mixture liquids 250, 251 and 252 are discharged in order of successively smaller refractive index to form a layered film.

Thus, the infrared radiation detecting device manufacturing method of this embodiment as illustrated basically includes the following steps. First, several mixing steps are performed to produce the combined liquid mixtures 203, 250, 251 and 252. In particular, a first mixing step is performed in which the a first infrared radiation absorbing substance 202a having a first prescribed refractive index is mixed with a liquid carrier material 201a having a first prescribed viscosity to form a first discharge material 209a from the combined mixture 203. Next, a second mixing step is performed in which a second infrared radiation absorbing substance 202b having a second smaller refractive index than the first infrared radiation absorbing substance 202a is mixed with the liquid carrier material 201b having a second prescribed viscosity together to form a second discharge material 209b from the combined liquid mixture 250. Next, a third mixing step is performed in which a third infrared radiation absorbing substance 202c having a third smaller refractive index than the first and second infrared radiation absorbing substances 202a and 202b is mixed with the liquid carrier material 201c having a third prescribed viscosity together to form a third discharge material 209c from the combined liquid mixture 251. Next, a fourth mixing step is performed in which a fourth infrared radiation absorbing substance 202d having a fourth smaller refractive index than the first, second and third infrared radiation absorbing substances 202a, 202b and 202c is mixed with the liquid carrier material 201d having a fourth prescribed viscosity together to form a fourth discharge material 209d from the combined liquid mixture 252.

Next, several filling steps are performed in which the pressure chambers 205 are filled with the combined liquid mixtures 203, 250, 251 and 252, respectively, i.e., the discharge materials. Now, a first discharge step is performed in which the combined liquid mixture 203 is first discharged from the discharge opening 206 of the first discharging device 204 as the first discharge material 209a by adjusting the pressure inside its pressure chamber 205 to deposit on the prescribed infrared radiation absorbing film formation region of the infrared radiation detecting device so as to form a first layer or portion of the infrared radiation absorbing film 104". Then, a first removal step is performed in which the liquid carrier material 201 a in the first discharge material 209a (the deposited liquid mixture 203) is removed.

A second discharge step is then performed after the first removal step. The combined liquid mixture 250 is discharged from the discharge opening 206 of the second discharging device 204 as the second discharge material 209b by adjusting the pressure inside the pressure chamber 205 to deposit on the prescribed infrared radiation absorbing film formation region of the infrared radiation detecting device so as to form a second layer or portion of the infrared radiation absorbing film 104" that overlies a part of the first layer or portion of the infrared radiation absorbing film 104". A second removal step is then performed in which the liquid carrier material 201b in the second discharge material 209b (the deposited liquid mixture 250) is removed.

A third discharge step is then performed after the second removal step. The combined liquid mixture 251 is discharged from the discharge opening 206 of the third discharging device 204 as the third discharge material 209c by adjusting the pressure inside the pressure chamber 205 to deposit on the prescribed infrared radiation absorbing film formation region of the infrared radiation detecting device so as to form a third layer or portion of the infrared radiation absorbing film 104" that overlies a part of the second layer or portion of the infrared radiation absorbing film 104". A third removal step is then performed in which the liquid carrier material 201c in the third discharge material 209c (the deposited liquid mixture 251) is removed.

Finally, a fourth discharge step is then performed after the third removal step. The combined liquid mixture 252 is discharged from the discharge opening 206 of the fourth discharging device 204 as the fourth discharge material 209d by adjusting the pressure inside the pressure chamber 205 to deposit on the prescribed infrared radiation absorbing film formation region of the infrared radiation detecting device so as to form a fourth layer or portion of the infrared radiation absorbing film 104" that overlies a part of the third layer or portion of the infrared radiation absorbing film 104". A fourth removal step is then performed in which the liquid carrier material 201d in the fourth discharge material 209d (the deposited liquid mixture 252) is removed.

Of course, it will be apparent to those skilled in the art from this disclosure that this method can include fewer or more layers of the infrared radiation absorbing film with each subsequently applied layer having a different/smaller refractive index than the prior layer and a liquid carrier material with a different/smaller prescribed viscosity than the prior layer. Moreover, it will be apparent to those skilled in the art from this disclosure that the subsequent discharges of the combined liquid mixtures are each conducted after a removal step that removes the liquid carrier material from the prior layer. Since this manufacturing method has steps for hardening the absorbing film one layer at a time, an absorbing film having multiple layers with optimized thickness and refractive index can be formed at a good yield.

Alternate Manufacturing Method

Referring now to FIGS. 18 and 19, an alternate manufacturing method is illustrated for manufacturing the infrared radiation absorbing film of the infrared radiation sensor elements S, S' and S". In other words, this alternate manufacturing method applies to the formation of an infrared radiation absorbing film for a one-dimensional or two-dimensional array sensor used for image acquisition and serves as an example of improving productivity by a discharging mixture liquid onto a plurality of sensor elements simultaneously.

When one or a small number of the discharging devices 204 are used in comparison to the number of pixels, the pixels must be formed one at a time or just a few at a time. A certain amount of drying time is required because the discharge material will mix together if it is discharged continuously without being allowed to dry and cure to some extent. By discharging onto adjacent pixels while previously coated pixels are drying, the waiting time can be reduced and the overall productivity can be improved.

Thus, this manufacturing method of FIGS. 18 and 19 is especially useful to manufacture an infrared radiation detecting device having an array sensor provided with a plurality of regions, i.e., the sensor elements S, S' or S" in which the infrared radiation absorbing film is formed. This method can be used in each of the methods discusses above for simultaneously manufacturing a plurality of the sensor elements S, S' or S". Thus, this method basically uses the processes described with reference to FIG. 3, 13 or 16, but also includes additional discharge steps for simultaneously manufacturing a plurality of the sensor elements S, S' or S". In this method the discharging of the discharge material is accomplished a plurality of sequential discharge steps. For simplicity of understanding the invention only six discharge steps are illustrated in FIGS. 18 and 19, and thus, only these six discharge steps will be described.

As seen in FIG. 18, a first discharge step is preformed by discharging a first quantity of the discharge material in a first infrared radiation absorbing film formation region. In other words, the first quantity of the discharge material is deposited on a first thermopile portion of a first sensor element. Then, a second discharge step is preformed by discharging a second quantity of the discharge material in an adjacent second infrared radiation absorbing film formation region while the first quantity of the discharge material deposited in the first infrared radiation absorbing film formation region is drying and curing. In other words, the second quantity of the discharge material is deposited on a second thermopile portion of a second sensor element. Next, a third discharge step is preformed by discharging a third quantity of the discharge material in a third infrared radiation absorbing film formation region while the first and second quantities of the discharge material deposited in the first and second infrared radiation absorbing film formation regions are drying and curing. In other words, the third quantity of the discharge material is deposited on the first thermopile portion of the first sensor element. Of course, it will be apparent to those skilled in the art that additional discharge steps are sequentially preformed by discharging an additional quantity of the discharge material in each of the other infrared radiation absorbing film formation regions while the prior quantity of the discharge material deposited in the prior infrared radiation absorbing film formation regions are drying and curing.

Now as seen in FIG. 19, three additional discharge steps are preformed on the first, second and third infrared radiation absorbing film formation regions. In particular, a fourth discharge step is preformed by discharging a fourth quantity of the discharge material in the first infrared radiation absorbing film formation region while the previously deposited quantities of the discharge material deposited in the second and third infrared radiation absorbing film formation regions are drying and curing. Next, a fifth discharge step is preformed by discharging a fifth quantity of the discharge material in the second infrared radiation absorbing film formation region while the previously deposited quantities of the discharge material deposited in the third and first infrared radiation absorbing film formation regions are drying and curing. Finally, a sixth discharge step is preformed by discharging a sixth quantity of the discharge material in the third infrared radiation absorbing film formation region while the previously deposited quantities of the discharge material deposited in the first and second infrared radiation absorbing film formation regions are drying and curing. Therefore, since discharge material can be applied to other adjacent pixels while allowing discharge material previously applied to any desired pixels to dry and cure, the total time required for forming the absorbing film is shortened and productivity can be improved.

Alternate Manufacturing Method

Referring now to FIGS. 20 and 21, still another alternate manufacturing method is illustrated for manufacturing the infrared radiation absorbing films 104 of the infrared radiation sensor element S illustrated in FIGS. 1 and 2. In other words, this alternate manufacturing method applies to the formation of an infrared radiation absorbing film for a one-dimensional or two-dimensional array sensor used for image acquisition and serves as an example of improving productivity by a discharging mixture liquid onto a plurality of sensor elements simultaneously. Thus, this manufacturing method is especially useful to manufacture an infrared radiation detecting device having an array sensor provided with a plurality of regions, i.e., sensor elements S in which the infrared radiation absorbing film 104 is formed.

This alternate manufacturing method utilizes the ability to form the infrared radiation absorbing film randomly in any location as described above. The infrared radiation detecting device includes an array sensor 261 having a detection pattern 260, formed by a plurality of low-sensitivity pixels 262 and a plurality of high-sensitivity pixels 263. Thus, the array sensor 261 is provided with a first region that correspond to the shape formed by the low-sensitivity pixels 262 and a second region that correspond to the shape formed by the high-sensitivity pixels 263. The low-sensitivity pixels 262 and the high-sensitivity pixels 263 are formed as the sensor elements S, discussed above. However, the low-sensitivity pixels 262 can be free of the infrared radiation absorbing film 104. The first regions with the sensor elements S are arranged such that the infrared radiation absorbing films 104 form a predetermined detecting region having a predetermined detecting shape that corresponds to an image shape of an object to be detected.

With the infrared radiation absorbing films 104 forming a region corresponding to an image shape of an object to be detected, the array sensor 261 can better detect the desired object. This is accomplished in a conventional manner such as by projecting the shape of a detected object onto array sensor 261 using an optical system. Consequently, the embodiment can accomplish highly precise pattern matching.

Pattern matching normally involves performing pattern recognition and judgment processing by using image processing and requires extremely complex processing. When the shape is specified in advance, i.e., predetermined, the infrared radiation absorbing films 104 are formed such that there is a one-to-one correspondence between the pixels of the array sensor 261 and the image of the targeted object, as shown in FIGS. 20 and 21. Only when the image of the object, i.e., the image of detection pattern 260, matches the pattern of the infrared radiation absorbing film 104 does the infrared radiation detecting device output exceed a prescribed value. Therefore, pattern matching can be accomplished completely without image processing.

Thermopile Infrared Radiation Detecting Element S'''

Referring now to FIGS. 22 and 23, a thermopile infrared radiation detecting device or sensor element S''' is illustrated in accordance with another embodiment of the present invention. The thermopile infrared radiation sensor element S''' is preferably manufactured using the method illustrated in FIGS. 24 and 25.

The thermopile infrared radiation sensor element S''' is identical to the thermopile infrared radiation sensor element S, discussed above, except for the formation of the infrared radiation absorbing film. Thus, the parts of the thermopile infrared radiation sensor element S''' that have identical functions to the thermopile infrared radiation sensor element S, discussed above, are indicated with identical reference symbols to avoid unnecessary repetition of the descriptions of the parts of the embodiments that have identical functions.

The thermopile infrared radiation sensor element S''' has an infrared radiation absorbing film 104''' constructed to convert incident infrared radiation with an intensity and a predetermined wavelength into thermal energy, and detect the intensity of the incident infrared radiation. The infrared radiation absorbing film 104''' includes a plurality of first surface areas $A_1$ having first refractive indices arranged in a predetermined pattern relative to a plurality of second surface areas $A_2$ having second refractive indices that are different from the first refractive indices of the first surface areas. The first and second surface areas $A_1$ and $A_2$ of the infrared radiation absorbing film 104''' are configured and arranged in the predetermined pattern to increase infrared radiation absorptance of the infrared radiation absorbing film 104'''.

The infrared radiation absorbing film 104''' of this embodiment is formed with a uniform film thickness as measured in a transverse direction between the infrared radiation incident surface and the infrared radiation emission surface. The infrared radiation incident surface is a substantially flat planar surface with different refractive indices formed by the first and second surface areas $A_1$ and $A_2$. The first and second surface areas $A_1$ and $A_2$ are configured and arranged with a predetermined spacing L within a plane to increase infrared radiation absorptance of the infrared radiation absorbing film 104'''.

Preferably, the predetermined pattern of the first and second surface areas $A_1$ and $A_2$ form a substantially checkerboard of the first and second surface areas $A_1$ and $A_2$ alternating relative to each other. Thus, the predetermined pattern of the first and second surface areas $A_1$ and $A_2$ also arranged to form substantially parallel diagonal lines of the first surface areas $A_1$ that alternate with substantially parallel lines of the second surface areas $A_2$.

Alternate Manufacturing Method

Referring now to FIGS. 24 and 25, still another alternate manufacturing method is illustrated for manufacturing the infrared radiation absorbing film 104''' of the infrared radiation sensor element S''' illustrated in FIGS. 22 and 23. In this manufacturing method the thermopile infrared radiation sensor element S''' is formed using two of the discharging devices 204 that have the pressure chambers 205 with the discharge openings 206 and the heating devices 207. The discharging devices 204 are discussed above in more detail with reference to FIG. 3. However, in this embodiment, two combined liquid mixtures 203a and 203b are prepared with each of the liquid mixtures 203a and 203b having a different refractive index. This can be accomplished in a variety of ways. For example, this can be accomplished by varying the concentration of the infrared radiation absorbing substance or using different materials. The combined liquid mixtures 203a and 203b can be simultaneously or sequentially discharged.

Thus, the infrared radiation detecting device manufacturing method of this embodiment as illustrated basically includes the following steps. First, two mixing steps are performed to produce the combined liquid mixtures 203a and 203b. In particular, a first mixing step is performed in which the a first infrared radiation absorbing substance 202a having a first prescribed refractive index is mixed with a liquid carrier material 201b having a first prescribed viscosity to form a first discharge material 209a from the combined mixture 203a. Next, a second mixing step is performed in which a second infrared radiation absorbing substance 202b having a second smaller refractive index than the first infrared radiation absorbing substance 202a is mixed with the liquid carrier material 201b having a second prescribed viscosity together to form a second discharge material 209b from the combined liquid mixture 203b.

Next, two filling steps are performed in which the pressure chambers 205 are filled with the combined liquid mixtures 203a and 203b, respectively, i.e., the discharge materials. Now, a first discharge step is performed in which the combined liquid mixture 203a is first discharged from the discharge opening 206 of the first discharging device 204 as the first discharge material 209a by adjusting the pressure inside its pressure chamber 205. Thus, the first discharge material 209a is deposited at a plurality of the first areas $A_1$ on the prescribed infrared radiation absorbing film formation region of the infrared radiation detecting device so as to form a first discontinuous layer or discrete portion of the infrared radiation absorbing film 104''.

A second discharge step is then performed after the first discharge step. The combined liquid mixture 203b is discharged from the discharge opening 206 of the second discharging device 204 as the second discharge material 209b by adjusting the pressure inside the pressure chamber 205. Thus, the second discharge material 209b is deposited at a plurality of the second areas $A_2$ on the prescribed infrared radiation absorbing film formation region of the infrared radiation detecting device so as to form a second discontinuous layer or second discrete portions of the infrared radiation absorbing film 104''. Then, a removal step is performed in which the liquid carrier materials 201a and 201b in the first and second discharge materials 209a and 209b are removed. This removal step can be performed in one or more steps, e.g., the first discharge material 209a can be removed prior to or after the second discharge material 209b is deposited.

Of course, it will be apparent to those skilled in the art from this disclosure that this method can include fewer or more layers of the infrared radiation absorbing film with each subsequently applied layer having a different/smaller refractive index than the prior layer and a liquid carrier material with a different/smaller prescribed viscosity than the prior layer. Since this manufacturing method has steps for hardening the absorbing film one layer at a time, an absorbing film having multiple layers with optimized thickness and refractive index can be formed at a good yield.

Thermopile Infrared Radiation Detecting Element S''''

Referring now to FIGS. 26 and 27, a thermopile infrared radiation detecting device or sensor element S'''' is illustrated in accordance with another embodiment of the present invention. The thermopile infrared radiation sensor element S"" is identical to the thermopile infrared radiation sensor element S, discussed above, except for the formation of the infrared radiation absorbing film. Thus, the parts of the thermopile infrared radiation sensor element S"" that have identical functions to the thermopile infrared radiation sensor element S, discussed above, are indicated with identical reference symbols to avoid unnecessary repetition of the descriptions of the parts of the embodiments that have identical functions.

The thermopile infrared radiation sensor element S"" is preferably manufactured using the method illustrated in FIGS. 24 and 25, but with two different infrared radiation absorbing substances being used for each of the layers. In particular, the infrared radiation absorbing film 104"" of the thermopile infrared radiation sensor element S"" has a non-uniform refractive index in each of the first and second areas $A_1$ and $A_2$ that extend between the infrared radiation incident surface where the infrared radiation strikes and the infrared radiation emission surface where the infrared radiation exits. Preferably, the non-uniform refractive index varies in a continuous manner between the infrared radiation incident surface and the infrared radiation emission surface. The infrared radiation incident surface of the infrared radiation absorbing film 104"" has a refractive index that is lower than the refractive index of the infrared radiation emission surface of the infrared radiation absorbing film 104"". In other words, the refractive index of the infrared radiation absorbing film 104' decreases in a monotonous manner as one moves in the upward direction in the figure, which further reduces the reflectance. Accordingly, the refractive index of the infrared radiation absorbing film 104"" is not uniform with respect to the direction of the film thickness but, instead, varies in a continuous manner in the transverse direction. As a result, since the refractive index is low at the incident point, the effective surface reflectance can be reduced and the infrared radiation absorptance can be increased.

Thermopile Infrared Radiation Detecting Element S""'

Referring now to FIGS. 28 and 29, a thermopile infrared radiation sensor element S""' is illustrated in accordance with another embodiment of the present invention. The thermopile infrared radiation sensor element S"' is preferably manufactured using the method illustrated in FIGS. 24 and 25. The thermopile infrared radiation sensor element S""' is identical to the thermopile infrared radiation sensor element S"', discussed above, except for the formation of the infrared radiation absorbing film which has a three dimensional surface identical to the sensor element S. Thus, the parts of the thermopile infrared radiation sensor element S""' that have identical functions to the thermopile infrared radiation sensor element S"', discussed above, are indicated with identical reference symbols to avoid unnecessary repetition of the descriptions of the parts of the embodiments that have identical functions.

In manufacturing the infrared radiation sensor elements described above, especially sensor elements S"" and S""', it is also acceptable to have the processes of: mixing of the discharge material, filling of the pressure chamber, discharging of the discharge material and removing of the liquid carrier material, performed in the manner described below. The mixing of the discharge material is performed by mixing together a first infrared radiation absorbing substance and a first liquid carrier material having a first prescribed viscosity to form a first discharge material portion, and mixing together a second infrared radiation absorbing substance having a smaller refractive index than the first infrared radiation absorbing substance and a second liquid carrier material having a second prescribed viscosity to form a second discharge material portion. The filling of the pressure chamber with the discharge material is formed by filling a first pressure chamber section having a first discharge opening with the first discharge material portion, and a second pressure chamber section having a second discharge opening with the second discharge material portion. The discharging of the discharge material is formed by first discharging the first discharge material portion from the first discharge opening by adjusting the pressure inside the first pressure chamber to deposit on a first location of the prescribed infrared radiation absorbing film formation region, and second discharging the second discharge material portion from the second discharge opening by adjusting the pressure inside the second pressure chamber to deposit on a second location of the prescribed infrared radiation absorbing film formation region that is different from the first location where the first discharge material first location was deposited. The removing of the liquid carrier material is formed by removing at least one of the first and second liquid carrier material deposited on the prescribed infrared radiation absorbing film formation region.

With this arrangement, two pressure chambers are each filled with mixture liquid having a different refractive index and the mixture liquids are discharged at different positions. Consequently, the infrared radiation absorbing film can be formed with good precision and the infrared radiation absorptance can be increased.

In manufacturing the infrared radiation sensor elements described above, especially sensor elements S"" and S""', it is also acceptable to have the processes of: mixing of the discharge material, filling of the pressure chamber, discharging of the discharge material and removing of the liquid carrier material, performed in the manner described below. The mixing of the discharge material is performed by mixing together a first infrared radiation absorbing substance and a first liquid carrier material having a first prescribed viscosity to form a first discharge material portion, and mixing together a second infrared radiation absorbing substance and a second liquid carrier material having a second prescribed viscosity with a smaller viscosity than the first prescribed viscosity to form a second discharge material portion. The filling of the pressure chamber with the discharge material is formed by filling a first pressure chamber section having a first discharge opening with the first discharge material portion, and a second pressure chamber section having a second discharge opening with the second discharge material portion. The discharging of the discharge material is formed by first discharging the first discharge material portion from the first discharge opening by adjusting the pressure inside the first pressure chamber to deposit on a first location of the prescribed infrared radiation absorbing film formation region, and second discharging the second discharge material portion from the second discharge opening by adjusting the pressure inside the second pressure chamber to deposit on a second location of the prescribed infrared radiation absorbing film formation region that is different from the first location where the first discharge material first location was deposited. The removing of the liquid carrier material is formed by removing at least one of the first and second liquid carrier material deposited on the prescribed infrared radiation absorbing film formation region.

With this arrangement, mixtures of differing viscosities are discharged to different locations. Consequently, infrared radiation absorbing films of various shapes can be formed, the surface reflectance can be reduced, and the infrared radiation absorptance can be increased.

Each of the above discussed manufacturing methods can be used to manufacture an infrared radiation detecting device having an array sensor provided with a plurality of regions or sensor elements S, S', S" or S'" in which a discontinuous infrared radiation absorbing film is formed. Thus, it is preferably to have steps in each of the above discussed manufacturing methods in which, after a pixel sensitivity inspection is performed to locate low-sensitivity pixels, additional discharge material obtained by mixing an infrared radiation absorbing substance with a liquid carrier material having a prescribed viscosity is added to the low-sensitivity pixels. Theses additional steps allows the sensitivity of the individual sensor elements S, S', S" or S" of the array sensor to be modified after a mounting inspection. Thus, the yield of the array sensor is improved.

In the preceding paragraphs the present invention was described in detail based on embodiments, but the present invention is not limited to these embodiments. A variety of modifications are possible that do not deviate from the gist of the invention.

For example, it is acceptable for infrared radiation absorbing substances having different refractive indices to be deposited in different planar regions. With this method, even within a single layer or a thin infrared radiation absorbing film, the reflectance can be reduced by planar interference of reflected light and, as a result, the infrared radiation absorptance can be increased.

The terms of degree such as substantially, about and approximately as used herein mean a reasonable amount of deviation of the modified term such that the end result is not significantly changed. For example, these terms can be construed as including a deviation of at least 5% of the modified term if this deviation would not negate the meaning of the word it modifies.

This application claims priority to Japanese Patent Application No. 2002-008264. The entire disclosure of Japanese Patent Application No. 2002-008264 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An infrared radiation detecting element comprising:
   an infrared radiation absorbing film constructed to convert incident infrared radiation with an intensity and a predetermined wavelength into thermal energy, and detect the intensity of the incident infrared radiation,
   the infrared radiation absorbing film including an infrared radiation incident surface with a plurality of first surface areas having first refractive indices arranged in a predetermined pattern relative to a plurality of second surface areas having second refractive indices that are different from the first refractive indices of the first surface areas,
   the first and second surface areas of the infrared radiation absorbing film being configured and arranged in the predetermined pattern to increase infrared radiation absorptance of the infrared radiation absorbing film.

2. The infrared radiation detecting element as recited in claim 1, wherein
   the infrared radiation absorbing film further includes an infrared radiation emission surface spaced from the infrared radiation incident surface,
   the first surface areas are formed by a plurality of thick points having first film thicknesses as measured in a transverse direction between the infrared radiation incident surface and the infrared radiation emission surface,
   the second surface areas are formed by a plurality of thin points having second film thicknesses as measured between the infrared radiation incident surface and the infrared radiation emission surface, and
   the thick and thin points being configured and arranged such that a predetermined film thickness difference is formed by a relative height difference between the thick and thin points and a predetermined spacing within a plane is formed between the thick points, the predetermined spacing and the predetermined film thickness difference are set to decrease effective surface reflectance due to interference or scattering of the incident infrared radiation striking the infrared radiation incident surface.

3. The infrared radiation detecting element as recited in claim 2, wherein
   the film thickness difference between the thick and thin points is at least equal to about ¼ of the predetermined wavelength of the incident infrared radiation being detected; and
   the predetermined spacing between the thick points within a plane is shorter than the predetermined wavelength of the incident infrared radiation being detected.

4. The infrared radiation detecting element as recited in claim 2, wherein
   the infrared radiation absorbing film has a non-uniform refractive index between the infrared radiation incident surface and the infrared radiation emission surface, the non-uniform refractive index varying in a continuous manner between the infrared radiation incident surface and the infrared radiation emission surface; and
   the infrared radiation incident surface of the infrared radiation absorbing film has a refractive index that is lower than a refractive index of the infrared radiation emission surface of the infrared radiation absorbing film.

5. The infrared radiation detecting element as recited in claim 2, wherein
   the infrared radiation absorbing film is a multi-layered structure having a plurality of layers with different refractive indices to form a non-uniform refractive index the transverse direction extending between the infrared radiation incident surface and the infrared radiation emission surface; and
   the infrared radiation incident surface of the infrared radiation absorbing film has a refractive index that is lower than a refractive index of the infrared radiation emission surface of the infrared radiation absorbing film.

6. The infrared radiation detecting element as recited in claim 1, wherein
   the infrared radiation incident surface is uneven to form a three dimensional surface.

7. The infrared radiation detecting element as recited in claim 1, wherein
   the infrared radiation incident surface is a substantially flat planar surface.

8. The infrared radiation detecting element as recited in claim 7, wherein the predetermined pattern of the first and second surface areas form substantially parallel lines of the first surface areas that alternate with substantially parallel lines of the second surface areas.

9. The infrared radiation detecting element as recited in claim 7, wherein
the predetermined pattern of the first and second surface areas form a substantially checkerboard of the first and second surface areas alternating relative to each other.

10. The infrared radiation detecting element as recited in claim 1, wherein
the infrared radiation absorbing film overlies a substrate with a cavity such that the infrared radiation absorbing film is suspended above the cavity; and
the infrared radiation absorbing film is formed above at least one cantilever beam with at least one thermopile having first and second spaced ends such that the infrared radiation absorbing film is supported by the second end of the cantilever beam to form a hot junction, the first end being connected to the substrate to form a cold junction with a predetermined distance being formed between the second end and the substrate.

11. An infrared radiation detecting element comprising:
an infrared radiation absorbing film constructed to convert incident infrared radiation with an intensity and a predetermined wavelength into thermal energy, and detect the intensity of the incident infrared radiation,
the infrared radiation absorbing film having a plurality of thick points with first film thicknesses arranged in a predetermined pattern relative to a plurality of thin points with second film thicknesses,
the thick and thin points being configured and arranged such that a predetermined film thickness difference is formed between the thick and thin points and a predetermined spacing within a plane is formed between the thick points,
the predetermined spacing and the predetermined film thickness difference are arranged and configured to decrease effective surface reflectance due to interference or scattering of the incident infrared radiation striking the infrared radiation absorbing film,
the infrared radiation absorbing film having an infrared radiation incident surface and an infrared radiation emission surface, the infrared radiation incident surface having a refractive index that is lower than a refractive index of the infrared radiation emission surface.

12. The infrared radiation detecting element as recited in claim 11, wherein
the film thickness difference between the thick and thin points is at least equal to about ¼ of the predetermined wavelength of the incident infrared radiation being detected; and
the predetermined spacing between the thick points within a plane is shorter than the predetermined wavelength of the incident infrared radiation being detected.

13. An infrared radiation detecting element comprising:
an infrared radiation absorbing film constructed to convert incident infrared radiation with an intensity and a predetermined wavelength into thermal energy, and detect the intensity of the incident infrared radiation,
the infrared radiation absorbing film having a plurality of thick points with first film thicknesses arranged in a predetermined pattern relative to a plurality of thin points with second film thicknesses,
the thick and thin points being configured and arranged such that a predetermined film thickness difference is formed between the thick and thin points and a predetermined spacing within a plane is formed between the thick points,
the predetermined spacing and the predetermined film thickness difference are arranged and configured to decrease effective surface reflectance due to interference or scattering of the incident infrared radiation striking the infrared radiation absorbing film,
the infrared radiation absorbing film having a non-uniform refractive index between an infrared radiation incident surface and an infrared radiation emission surface, the non-uniform refractive index varying in a continuous manner between the infrared radiation incident surface and the infrared radiation emission surface, and
the infrared radiation incident surface of the infrared radiation absorbing film having a refractive index that is lower than a refractive index of the infrared radiation emission surface of the infrared radiation absorbing film.

14. An infrared radiation detecting element comprising:
an infrared radiation absorbing film constructed to convert incident infrared radiation with an intensity and a predetermined wavelength into thermal energy, and detect the intensity of the incident infrared radiation,
the infrared radiation absorbing film having a plurality of thick points with first film thicknesses arranged in a predetermined pattern relative to a plurality of thin points with second film thicknesses,
the thick and thin points being configured and arranged such that a predetermined film thickness difference is formed between the thick and thin points and a predetermined spacing within a plane is formed between the thick points,
the predetermined spacing and the predetermined film thickness difference are arranged and configured to decrease effective surface reflectance due to interference or scattering of the incident infrared radiation striking the infrared radiation absorbing film,
the infrared radiation absorbing film is being a multi-layered structure having a plurality of layers with different refractive indices to form a non-uniform refractive index the transverse direction extending between an infrared radiation incident surface and an infrared radiation emission surface, and
the infrared radiation incident surface of the infrared radiation absorbing film having a refractive index that is lower than a refractive index of the infrared radiation emission surface of the infrared radiation absorbing film.

15. An infrared radiation detecting element comprising:
an infrared radiation absorbing film constructed to convert incident infrared radiation with an intensity and a predetermined wavelength into thermal energy, and detect the intensity of the incident infrared radiation,
the infrared radiation absorbing film having a plurality of thick points with first film thicknesses arranged in a predetermined pattern relative to a plurality of thin points with second film thicknesses,
the thick and thin points being configured and arranged such that a predetermined film thickness difference is formed between the thick and thin points and a predetermined spacing within a plane is formed between the thick points,
the predetermined spacing and the predetermined film thickness difference are arranged and configured to decrease effective surface reflectance due to interference or scattering of the incident infrared radiation striking the infrared radiation absorbing film,
the infrared radiation absorbing film overlying a substrate with a cavity such that the infrared radiation absorbing film is suspended above the cavity, and the infrared radiation absorbing film being formed above at least one cantilever beam with at least one thermopile having first and second spaced ends such that the infrared radiation absorbing film is supported by the second end of the cantilever beam to form a hot junction, the first end being connected to the substrate to form a cold junction with a predetermined distance being formed between the second end and the substrate.

* * * * *